US011157968B2

(12) United States Patent
Box et al.

(10) Patent No.: US 11,157,968 B2
(45) Date of Patent: Oct. 26, 2021

(54) SYSTEMS, METHODS AND ARTICLES TO FACILITATE CROSS-CHANNEL PROGRAMMATIC PURCHASING OF ADVERTISING INVENTORY

(71) Applicant: WIDEORBIT LLC, San Francisco, CA (US)

(72) Inventors: Tyler Wallace Box, San Francisco, CA (US); Brian M. Burdick, Newcastle, WA (US); Geoffrey P. Coco, Seattle, WA (US); Ian P. Ferreira, Issaquah, WA (US); Paul Jaffe, Sherman Oaks, CA (US); Alfred Lawrence Shiels, Glen Rock, NJ (US); Brian Thoman, Everett, WA (US); Ola Tiverman, Gothenburg (SE); Sean Trigony, Hermosa Beach, CA (US); Stacey N. Young, New York, NY (US)

(73) Assignee: WIDEORBIT LLC, San Francisco, CA (US)

( * ) Notice: Subject to any disclaimer, the term of this patent is extended or adjusted under 35 U.S.C. 154(b) by 395 days.

(21) Appl. No.: 15/448,228

(22) Filed: Mar. 2, 2017

(65) Prior Publication Data
US 2017/0255971 A1    Sep. 7, 2017

Related U.S. Application Data

(60) Provisional application No. 62/303,271, filed on Mar. 3, 2016.

(51) Int. Cl.
*G06Q 30/02* (2012.01)
(52) U.S. Cl.
CPC ..... *G06Q 30/0273* (2013.01); *G06Q 30/0249* (2013.01)

(58) Field of Classification Search
None
See application file for complete search history.

(56) References Cited

U.S. PATENT DOCUMENTS 7,085,732 B2    8/2006    Gould
7,949,562 B2    5/2011    Collins
(Continued)

FOREIGN PATENT DOCUMENTS

JP    2007-226816 A    9/2007
JP    2014-146274 A    8/2014
(Continued)

OTHER PUBLICATIONS

Gopal, Ram, Online keyword based advertising: Impact of ad impressions on own-channel and cross-channel click-through rates, p. 5 and 6 , https://www.sciencedirect.com/science/article/pii/S0167923611001035 (Year: 2011).*
(Continued)

*Primary Examiner* — George Chen
*Assistant Examiner* — Alfred H Tsui
(74) *Attorney, Agent, or Firm* — Seed Intellectual Property Law Group LLP

(57) ABSTRACT

Systems and methods for providing an advertisement platform where buyers and sellers can trade advertisement inventory programmatically at local, national, and/or worldwide levels. The advertisement platform server system may include an advertiser facing interface which permits advertisers to generate a request for orders (RFO) for an advertisement campaign which spans multiple advertisement channels. The RFO may be automatically provided to numerous media content providers, which may place committed orders which are to be autonomously accepted upon satisfaction of at least one condition of the RFO, such as a minimum budget. Once the committed orders are accepted,
(Continued)

the advertisements may be routed to a traffic management system for publishing.

24 Claims, 23 Drawing Sheets

(56) References Cited

U.S. PATENT DOCUMENTS

| | | | |
|---|---|---|---|
| 8,073,738 | B2 | 12/2011 | Protheroe et al. |
| 8,099,328 | B2 | 1/2012 | Protheroe et al. |
| 8,386,315 | B1* | 2/2013 | Bala .................. G06Q 30/0241 705/14.43 |
| 8,996,712 | B2 | 3/2015 | Green et al. |
| 2003/0149622 | A1* | 8/2003 | Singh ................. G06Q 30/0247 705/14.48 |
| 2006/0026063 | A1 | 2/2006 | Collins |
| 2007/0006264 | A1* | 1/2007 | Steelberg ........... G06Q 30/0269 725/46 |
| 2008/0071594 | A1 | 3/2008 | Morin |
| 2008/0221982 | A1 | 9/2008 | Harkins et al. |
| 2008/0243601 | A1 | 10/2008 | Patel et al. |
| 2009/0106100 | A1 | 4/2009 | Mashinsky |
| 2010/0145793 | A1* | 6/2010 | Cavander ......... G06Q 10/06315 705/14.42 |
| 2011/0040634 | A1 | 2/2011 | Landsberry et al. |
| 2011/0225026 | A1 | 9/2011 | Ketchum |
| 2012/0209742 | A1 | 8/2012 | Steigelfest |
| 2013/0144723 | A1 | 6/2013 | Green et al. |
| 2013/0282495 | A1 | 10/2013 | Gilbane et al. |
| 2014/0136337 | A1 | 5/2014 | Ringdahl |
| 2014/0222590 | A1 | 8/2014 | Chatter et al. |
| 2014/0324603 | A1 | 10/2014 | Savkar et al. |
| 2015/0095166 | A1 | 4/2015 | Sweeney |
| 2016/0100026 | A1* | 4/2016 | Musumeci .......... H04L 67/2842 709/217 |
| 2017/0098251 | A1 | 4/2017 | Box et al. |
| 2017/0098252 | A1 | 4/2017 | Box et al. |
| 2017/0098253 | A1 | 4/2017 | Box et al. |

FOREIGN PATENT DOCUMENTS

| | | |
|---|---|---|
| KR | 10-2010-0108191 A | 10/2010 |
| KR | 20100108191 A * | 10/2010 |
| KR | 10-2012-0034434 A | 4/2012 |
| WO | 2015/024003 A2 | 2/2015 |

OTHER PUBLICATIONS

International Search Report and Written Opinion dated Jan. 11, 2017, for corresponding International Application No. PCT/US2016/054183, 15 pages.
International Search Report and Written Opinion dated Jan. 13, 2017, for corresponding International Application No. PCT/US2016/054176, 11 pages.
International Search Report and Written Opinion dated Dec. 8, 2016, for corresponding International Application No. PCT/US2016/054169, 15 pages.
International Search Report and Written Opinion, dated Jun. 7, 2017, for corresponding International Application No. PCT/US2017/020436, 13 pages.
Offeman et al., "Systems, Methods and Articles for Audience Delivery Optimization," U.S. Appl. No. 16/143,214, filed Sep. 26, 2018, 34 pages.
Office Action, dated Aug. 28, 2018, for U.S. Appl. No. 15/279,069, Box et al., "Systems, Methods and Articles to Facilitate Selling of Advertising Inventory ," 28 pages.
Office Action, dated Aug. 28, 2018, for U.S. Appl. No. 15/279,073, Box et al., "Systems, Methods and Articles to Facilitate Interoperability Between Advertising Inventory Channels ," 25 pages.
Office Action, dated Aug. 28, 2018, for U.S. Appl. No. 15/279,077, Box et al., "Systems, Methods and Articles to Facilitate Buying and Selling of Advertising Inventory ," 27 pages.
Supplementary European Search Report, dated May 28, 2019, for corresponding European Application No. 17760809.8-1217 / 3408820, 9 pages.
Extended European Search Report, dated Dec. 14, 2018, for European Application No. 16852483.3-1208, 9 pages.
Extended European Search Report, dated Dec. 14, 2018, for European Application No. 16852486.6-1208, 11 pages.
Extended European Search Report, dated Dec. 14, 2018, for European Application No. 16852490.8-1208, 9 pages.
Ferreira et al., "Systems, Methods and Articles for Buy-Side Optimization of Content Placement in Linear Mediacasts," U.S. Appl. No. 16/156,869, filed Oct. 10, 2018, 63 pages.
IAB, "OpenRTB API Specification," Version 2.1, Oct. 2012, 80 pages.
Thoman et al., "Systems, Methods and Articles for Sell-Side Optimization of Content Placement in Linear Mediacasts," U.S. Appl. No. 16/232,734, filed Dec. 26, 2018, 46 pages.

* cited by examiner

602 — IMPLEMENT BUDGET CAPPING THAT PREVENTS ACCEPTANCE OF REQUESTS FROM ADVERTISER ONCE ADVERTISER-SPECIFIED BUDGET FOR DEFINED CAMPAIGN IS EXCEEDED BY ACCEPTANCE BY MEDIACAST CONTENT PROVIDERS OF OTHER REQUESTS BY ADVERTISER FOR DEFINED CAMPAIGN

FIG.6

702 — IMPLEMENT SMOOTHING THAT PREVENTS ACCEPTANCE OF REQUESTS FROM ADVERTISER ONCE ADVERTISER SPECIFIED MAXIMUM CONCENTRATION FOR DEFINED CAMPAIGN IS EXCEEDED BY ACCEPTANCE BY MEDIACAST CONTENT PROVIDERS OF OTHER REQUESTS BY ADVERTISER FOR DEFINED CAMPAIGN

FIG.7

802 — IMPLEMENT DAILY CLOSE OF ALL ADVERTISEMENT PLACEMENT OPPORTUNITIES PERTAINING TO GIVEN MEDIACAST DAY, REQUESTS FOR ADVERTISEMENT PLACEMENT OPPORTUNITIES PERTAINING TO GIVEN MEDIACAST DAY, AND ACCEPTANCES OF REQUESTS FOR ADVERTISEMENT PLACEMENT OPPORTUNITIES PERTAINING TO GIVEN MEDIACAST DAY

FIG.8

New Direct Response Avail — 1300

- 1302 Description
- 1304 Pricing
- 1306 Reserve Rule

Name:
Weekend Morning — 1308

Program Notes:
After News DR — 1310

Channel:
KCPO — 1312

Start Time:
8:00 AM — 1314

End Time:
10:00 PM — 1316

Days:
| M | TU | W | TH | F | SA | SU | — 1318

Spot Lengths: (seconds) — 1320
- ☐ 00:05
- ☐ 00:10
- ☐ 00:15
- ☑ 00:30
- ☐ 00:45
- ☐ 01:00
- ☑ 01:30
- ☐ 02:00

SAVE    CANCEL

DEMAND  APPROVALS  RESULTS  SETUP

[Creative] Credit  Avail Rates — _1502_

Creatives — _1504_

| Action | Advertiser | Title | Ad Id | Status | Agency | Primary Category | File |
|---|---|---|---|---|---|---|---|
| | Good Feet | Good Feed-Mizuno Co-... | MIZU0001000H | Needs Review | Initiative | | No Time to Think-YouTu |
| | The SCOOTER Store | KTEST1 | WOID497568358 | Approved | Initiative | | womc-passion.mp4 |
| | GroupM's Test Advertiser | | BB0008 | Rejected | Groupm Test Agency | | sintel-1024-stereo.mp4 |
| | Chief Media | Sixty Hours | WOID3535753452 | Needs Review | Chief Media | Technology & Computing-C/C++ | Tenali Raman-Official Th |
| | Chief Media | Somke(june5) | WOID1648273945 | Needs Review | Chief Media | Technology & Computing-C/C++ | Tenali Raman-Official Th |
| | Chief Media | Walking Dead | WOID2283926915 | Needs Review | Chief Media | Technology & Computing-C/C++ | oreo.mp4 |
| | Tempur-Pedic | Ritz/Oreo Pre-BB | WOID4241929929 | Needs Review | Initiative | | womc-passion(1).mp4 |

| Channel ↑ | Claimed | Unclaimed | Claimed Uplift | Top Advertisers — _1601_ | Highest Offer | # of Offers |
|---|---|---|---|---|---|---|
| KCPQ | $311,512 | $1,834,870 | +308,864 | Work Sharp, Thompson Creek Window Company, David's Dollar Store | $53,797 | 4970 |
| KDAF | $7,701 | $1,587,928 | | Thompson Creek Window Company, David's Dollar Store, GroupM's Test Adventure | $11,794 | 3651 |
| KIAH2 | $7,202 | $1,606,902 | | Thompson Creek Window Company, Gunthy-Renker, David's Dollar Store | $11,106 | 3457 |
| KRCW | $9,822 | $327,447 | | Thompson Creek Window Company, GroupM's Test Advertiser, Green Inc. | $3,836 | 2751 |
| KSWB | $2,895 | $952,482 | | Thompson Creek Window Company, David's Dollar Store, GroupM's Test Advertiser | $18,125 | 2901 |
| KTLA | $11,736 | $4,605,468 | | Thompson Creek Window Company, David's Dollar Store, GroupM's Test Advertiser | $45,583 | 5183 |
| KTXL | $256 | $1,153,563 | | Thompson Creek Window Company, David's Dollar Store, Chief Media | $19,031 | 3710 |
| KZJO | $10,648 | $499,468 | | Thompson Creek Window Company, GroupM's Test Advertiser, SENSA Products | $5,732 | 3615 |

Demand Listing

Channel: KCPQ
Week: 04/06/2015

| | Channel | Advertiser | Creative Title | Creative Id | Agency | Week ↑ | Days | Start Time | End Time | # of Offers | Unit Length | Rate | EU :30 Rate |
|---|---|---|---|---|---|---|---|---|---|---|---|---|---|
| ✏ | KCPQ | Dunkin Don.... | QA–Transisti... | WOCMP–37... | Omega Mar... | 04/06/15 | ——S | 5:00 PM | 5:30 PM | 1 | :30 | $116.90 | $116.90 |
| ✏ | KCPQ | Dunkin Don.... | QA–Transisti... | WOCMP–37... | Omega Mar... | 04/06/15 | —T— | 6:00 AM | 10:00 AM | 8 | :30 | $35.13 | $35.13 |
| ✏ | KCPQ | Thompson.... | BugBashSm... | WOCMP–37... | Omega Mar... | 04/06/15 | ——S | 5:00 XM | 6:00 XM | 2 | :30 | $1,049.40 | $1,049.40 |
| ✏ | KCPQ | Thompson.... | BugBashSm... | WOCMP–37... | Omega Mar... | 04/06/15 | —T— | 10:00 AM | 10:30 AM | 25 | :30 | $493.80 | $493.80 |
| ✏ | KCPQ | Dunkin Don.... | QA–Transisti... | WOCMP–37... | Omega Mar... | 04/06/15 | —T— | 6:00 AM | 10:30 PM | 33 | :30 | $16.27 | $16.27 |
| ✏ | KCPQ | Thompson.... | BugBashSm... | WOCMP–37... | Omega Mar... | 04/06/15 | —F— | 5:30 PM | 8:00 PM | 5 | :30 | $2,795.04 | $2,795.04 |
| ✏ | KCPQ | Dunkin Don.... | QA–Transisti... | WOCMP–37... | Omega Mar... | 04/06/15 | —F— | 6:00 AM | 1:30 PM | 15 | :30 | $21.04 | $21.04 |
| ✏ | KCPQ | Thompson.... | BugBashSm... | WOCMP–37... | Omega Mar... | 04/06/15 | W—— | 10:30 AM | 8:00 PM | 19 | :30 | $1,297.20 | $1,297.20 |

FIG.19

Order Status

DEMAND  APPROVALS  RESULTS  SETUP

Order Status | Reports

CREATE ORDERS

| | Channel | Agency | Advertiser | Creative Id | Week | First Air Date | Units | Revenue | Length | Alt Order Number |
|---|---|---|---|---|---|---|---|---|---|---|
| ◉ 🗎 | KIPQ | Tube Test Agy | Tube Test Adv | WOCMP-304... | 03/09/15 | 03/11/15 | 2 | $600 | :16 | WOP20000192 |
| ◉ 🗎 | KIPQ | Tube Test Agy | Tube Test Adv | WOCMP-304... | 03/09/15 | 03/11/15 | 4 | $1,200 | :16 | WOP20000193 |
| ◉ 🗎 | KIPQ | Tube Test Agy | Tube Test Adv | WOCMP-304... | 03/09/15 | 03/11/15 | 4 | $1,200 | :16 | WOP20000195 |
| ◉ 🗎 | KIPQ | Omega Marke... | Work Sharp | WOCMP-370... | 03/16/15 | 03/17/15 | 2 | $81 | :30 | WOP20000204 |
| ◉ 🗎 | KTLA | Omega Marke... | Johnson & Jo... | WOCMP-371... | 03/16/15 | 03/16/15 | 2 | $852 | :30 | WOP20000201 |
| ◉ 🗎 | KTLA | Omega Marke... | Johnson & Jo... | WOCMP-371... | 03/16/15 | 03/16/15 | 3 | $518 | :30 | WOP20000203 |
| ◉ 🗎 | KTLA | Omega Marke... | Johnson & Jo... | WOCMP-371... | 03/30/15 | 04/05/15 | 3 | $54 | :30 | WOP20000203 |

Review Credit: Advertiser A  ⊗

[Details]  [Approvals]

2302              2304
                                              CREDIT LIMIT      CREDIT AVAILABLE
Name:                                         $130,200.00      $130,200.00
Advertiser A

2306                                                          2308

STATUS                                                    DAYS OUTSTANDING
Varies                                                        0
10 approvals out of 10 responding marketplace channels

2310

ADVERTISER CATEGORIES                                     LAST UPDATED
Hobbies & Interests  Art/Technology                           19/29/2015 8:30 AM
Travel  Adventure Travel 2312              2314

AGENCY OF RECORD FORM   CREDIT APPLICATION
📎                 📎

[SAVE]  [CANCEL]

FIG.23

*2602* — CAMPAIGN NAME
*2604* — ADVERTISER NAME [XYZ]
*2606* — TOTAL BUDGET [$9,000,000]   *2608* TARGET CPM [$25.00]   *2610* FREQUENCY CAP [5]
*2614* — RFO FLIGHT DATES [01/1/2016 – 01/15/2016]
*2612* — RFO OPEN DATES [12/1/2015 – 12/15/2015]
*2616* — PACING TO GOAL   *2618*
45% FUNDED    $4,050,000 PLEDGED

*2620*
AUDIENCE TARGETING DATA – XXX XXXXXX
GEOGRAPHY: DMA – NEW YORK, LOS ANGELES, SAN FRANCISCO-SAN JOSE
GENDER: FEMALE
AGE: 25-29, 30-34, 35-39
DEVICE:
CATEGORY: ART & ENTERTAINMENT, BEAUTY & FITNESS, COMPUTERS & ELECTRONICS

☑ PROGRAMMATIC BROADCAST TELEVISION
   TARGET CPM $250.00
   [##%] SHARE OF THE INVENTORY [CREATIVE]

☐ PROGRAMMATIC BROADCAST RADIO
   TARGET CPM $250.00
   [##%] SHARE OF THE INVENTORY [CREATIVE]

☐ PROGRAMMATIC STREAMING RADIO
   TARGET CPM $250.00
   [##%] SHARE OF THE INVENTORY [CREATIVE]

☐ PROGRAMMATIC PODCASTING
   TARGET CPM $250.00
   [##%] SHARE OF THE INVENTORY [CREATIVE]

☑ PROGRAMMATIC DISPLAY
   TARGET CPM $2.00
   [##%] SHARE OF THE INVENTORY [CREATIVE]

☑ PROGRAMMATIC MOBILE OPTIMIZED WEB
   TARGET CPM $2.00
   [##%] SHARE OF THE INVENTORY [CREATIVE]

☑ PROGRAMMATIC MOBILE IN-APP
   TARGET CPM $2.50
   [##%] SHARE OF THE INVENTORY [CREATIVE]

☑ PROGRAMMATIC VIDEO
   TARGET CPM $12.00
   [##%] SHARE OF THE INVENTORY [CREATIVE]

- 2702 — CAMPAIGN NAME
- 2704 — ADVERTISER NAME: XYZ
- 2706 — BUDGET GOAL: $9,000,000    2708 TARGET CPM: $25.00    2710 FREQUENCY CAP: 5
- 2722 — BUDGET MIN: $8,000,000
- 2712 — RFO FLIGHT DATES: 12/1/2015 – 12/15/2015
- 2712 — RFO OPEN DATES: 12/1/2015 – 12/15/2015
- 2716 — % BUDGET GOAL
  - 41% FUNDED    $3,690,000 PLEDGED

TOTAL AVAILABLE BUDGET
$2,000,000

SHARE OF THE INVENTORY
BUDGET ALLOCATED $750,000
TARGET CMP $12.00

<SUBMIT>

2724

2720 — AUDIENCE TARGETING DATA – NIELSEN
GEOGRAPHY: DMA – NEW YORK, LOS ANGELES, SAN FRANCISCO-SAN JOSE
GENDER: FEMALE
AGE: 25-29, 30-34, 35-39

OVERALL
[OLAY] [RPO] [FEMALES 35+] [FEB 1–FEB 28]

| | |
|---|---|
| IMPRESSION EST. | ADDITIONAL PROFIT |
| 1,100,000 | 10,000 |
| BUDGET | CPM |
| $50,000 | 32.00 |

☑ PROGRAMMATIC BROADCAST TELEVISION    ☑ PROGRAMMATIC VIDEO    ☐ PROGRAMMATIC DISPLAY

CREATIVE PREVIEW ▶
TOTAL AVAILABLE BUDGE: $1,500,000
SHARE OF THE INVENTORY
BUDGET ALLOCATED $525,000
TARGET CPM $250.00

CREATIVE PREVIEW ▶
TOTAL AVAILABLE BUDGE: $250,000
SHARE OF THE INVENTORY
BUDGET ALLOCATED $225,000
TARGET CPM $12.00

CREATIVE PREVIEW ▶
TOTAL AVAILABLE BUDGE: $250,000
SHARE OF THE INVENTORY
BUDGET ALLOCATED $0
TARGET CPM $12.00

FIG.27

SYSTEMS, METHODS AND ARTICLES TO FACILITATE CROSS-CHANNEL PROGRAMMATIC PURCHASING OF ADVERTISING INVENTORY

BACKGROUND

Field

This disclosure generally relates to computer-implemented systems and methods which facilitate the purchasing of advertising inventory.

Description of the Related Art

Content providers such as radio stations and networks, television stations and networks, Webcasters, digital publishers, etc., provide programming including content which is the subject of programming. Content providers' delivery of content is often via broadcasts or Webcasts (collectively, "mediacasts"). While content providers may employ repeaters and the like, broadcasts are typically limited in range to a geographic region.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Given that most broadcasts are local in nature or extent, content providers often carry advertisements and other material which is of a somewhat local or parochial interest. For example, a local chain may place advertisements with a local broadcaster since the audience targeted by the local chain is also often local and local advertising tends to be less expensive than regional or national advertising.

New approaches that automate the various activities related to buying, selling and placement of new materials, for instance, advertisements, in media delivery systems are desirable.

BRIEF SUMMARY

A method to automate advertisement placement in media delivery systems may be summarized as including receiving, by at least one advertisement platform server processor via an advertiser-facing interface, a request for orders (RFO) from an advertiser, the RFO indicates requests for a plurality of orders for advertisements associated with a future advertisement campaign which spans multiple types of advertisement channels, the RFO specifies at least one condition for the advertisement campaign; providing, by the at least one advertisement platform server processor via a media content provider-facing interface, the RFO to a plurality of media content providers; receiving, by the at least one advertisement platform server processor via the media content provider-facing interface, committed orders to place advertisements for the advertiser from at least one media content provider, each of the orders satisfying at least a portion of the at least one condition; autonomously comparing, by the at least one advertisement platform server processor, the received orders to the at least one condition for the advertisement campaign; responsive to the comparing of the received orders to the at least one condition, autonomously determining, by the at least one advertisement platform server processor, that the received orders cumulatively satisfy the at least one condition for the advertisement campaign; and responsive to determining that the received orders satisfy the at least one condition, autonomously causing, by the at least one advertisement platform server processor, an acceptance of each of the received orders to place advertisements for the advertiser. Receiving an RFO from an advertiser may include receiving an RFO from an advertiser which specifies at least one of a minimum spending budget, a per-media content provider spending limit, a media channel type spending limit, a target CPM, a target demographic, a target subject matter category, a target geographic area, or a target delivery date range. Receiving a request for orders (RFO) from an advertiser may include receiving a request for orders (RFO) from an advertiser which spans at least two of: broadcast television, broadcast radio, streaming radio, podcasting, display, mobile Web, mobile in-app advertisement, or video. Receiving an RFO from an advertiser may include receiving an RFO from an advertiser which indicates requests for a plurality of orders for at least linear advertisement channels and digital advertisement channels.

The method may further include, prior to determining that the received orders cumulatively satisfy the at least one condition for the advertisement campaign, providing, by the at least one advertisement platform server processor, status information regarding the received orders to at least one of the advertiser or the plurality of media content providers. The at least one condition for the advertisement campaign may include a minimum spending budget, and providing status information regarding the received orders to at least one of the advertiser or the plurality of media content providers may include providing status information regarding the received orders relative to the minimum spending budget. Providing status information regarding the received orders to at least one of the advertiser or the plurality of media content providers may include providing a present percentage of the minimum spending budget committed by the received orders. Providing status information regarding the received orders to at least one of the advertiser or the plurality of media content providers may include providing a present amount committed by the received orders. Receiving RFO from an advertiser may include receiving an RFO from an advertiser which indicates requests for a plurality of orders which specify a common currency across the multiple types of advertisement channels.

The method may further include providing, by the at least one advertisement platform server processor via the media content provider-facing interface, media content providers with a comparison between the requests for offers in the RFO and at least one offer received through at least one non-programmatic sales channel.

The method may further include providing, by the at least one advertisement platform server processor via the media content provider-facing interface, media content providers with an indication of lift expected by providing one or more offers responsive to the RFO. Providing media content providers with an indication of lift may include providing media content providers with an indication of lift as a function of a minimum spending budget specified by the RFO. Providing media content providers with an indication of lift may include providing media content providers with a separate indication of lift for each of the multiple types of advertisement channels. Receiving an RFO from an advertiser may include receiving an RFO from an advertiser which specifies a separate minimum spending budget for at least two of the multiple types of advertisement channels. Receiving an RFO from an advertiser may include receiving an RFO from an advertiser which identifies at least one special term negotiated between the advertiser and at least one of the media content providers, the at least one special term applying across at least two of the multiple types of advertisement channels. Receiving an RFO from an advertiser which identifies at least one special term may include receiving an RFO from an advertiser which identifies at least one rate discount negotiated between the advertiser and at least one of the media content providers, the at least one rate discount applying across at least two of the multiple types of advertisement channels.

A system to automate advertisement placement in media may be summarized as including at least one advertisement platform server processor; at least one nontransitory processor-readable storage medium communicatively coupled to the at least one advertisement platform server processor that stores at least one of processor-readable instructions or data which, when executed by the at least one advertisement platform server processor, cause the advertisement platform server processor to: receive, via an advertiser-facing interface, a request for orders (RFO) from an advertiser, the RFO indicates requests for a plurality of orders for advertisements associated with a future advertisement campaign which spans multiple types of advertisement channels, the RFO specifies at least one condition for the advertisement campaign; provide, via a media content provider-facing interface, the RFO to a plurality of media content providers; receive, via the media content provider-facing interface, committed orders to place advertisements for the advertiser from at least one media content provider, each of the orders satisfying at least a portion of the at least one condition; autonomously compare the received orders to the at least one condition for the advertisement campaign; responsive to the comparison of the received orders to the at least one condition, autonomously determine, by the at least one advertisement platform server processor, that the received orders cumulatively satisfy the at least one condition for the advertisement campaign; and responsive to the determination that the received orders satisfy the at least one condition, autonomously cause, by the at least one advertisement platform server processor, an acceptance of each of the received orders to place advertisements for the advertiser. The RFO may specify at least one of a minimum spending budget, a per-media content provider spending limit, a media channel type spending limit, a target CPM, a target demographic, a target subject matter category, a target geographic area, or a target delivery date range. The RFO may span at least two of: broadcast television, broadcast radio, streaming radio, podcasting, display, mobile Web, mobile in-app advertisement, or video. The RFO may indicate requests for a plurality of orders for at least linear advertisement channels and digital advertisement channels.

The at least one advertisement platform server processor may, prior to the determination that the received orders cumulatively satisfy the at least one condition for the advertisement campaign, provide status information regarding the received orders to at least one of the advertiser or the plurality of media content providers. The at least one condition for the advertisement campaign may include a minimum spending budget, and the at least one advertisement platform server processor may provide status information regarding the received orders relative to the minimum spending budget. The at least one advertisement platform server processor may provide a present percentage of the minimum spending budget committed by the received orders. The at least one advertisement platform server processor may provide a present amount committed by the received orders. The RFO may indicate requests for a plurality of orders which specify a common currency across the multiple types of advertisement channels. The at least one advertisement platform server processor may provide, via the media content provider-facing interface, media content providers with a comparison between the requests for offers in the RFO and at least one offer received through at least one non-programmatic sales channel. The at least one advertisement platform server processor may provide, via the media content provider-facing interface, media content providers with an indication of lift expected by providing one or more offers responsive to the RFO. The at least one advertisement platform server processor may provide, via the media content provider-facing interface, media content providers with an indication of lift as a function of a minimum spending budget specified by the RFO. The at least one advertisement platform server processor may provide, via the media content provider-facing interface, media content providers with a separate indication of lift for each of the multiple types of advertisement channels. The RFO may specify a separate minimum spending budget for at least two of the multiple types of advertisement channels. The RFO may identify at least one special term negotiated between the advertiser and at least one of the media content providers, the at least one special term applying across at least two of the multiple types of advertisement channels. The RFO may identify at least one rate discount negotiated between the advertiser and at least one of the media content providers, the at least one rate discount applying across at least two of the multiple types of advertisement channels.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 6 shows a method of operating an advertisement platform server system, according to one illustrated implementation, which may be employed in performing the method of FIG. 4.

FIG. 7 shows a method of operating an advertisement platform server system, according to one illustrated implementation, which may be employed in performing the method of FIG. 4.

FIG. 8 shows a method of operating an advertisement platform server system, according to one illustrated implementation, which may be employed in performing the method of FIG. 4.

FIG. 13 is a screenshot of a new direct response avail window of a seller console which allows a seller to define a new direct response avail time, according to one illustrated implementation.

FIG. 14 is a screenshot of a new accept rule window of a seller console which includes a description tab and a rule items tab, according to one illustrated implementation.

FIG. 15 is a screenshot of a creative area window of a seller console which provides a view of creatives, according to one illustrated implementation.

FIG. 16 is a screenshot of a dashboard window of a seller console which shows a plurality of offers, according to one illustrated implementation.

FIG. 17 is a screenshot of a calendar area window of a seller console which shows a color-coded calendar-based heat map for a number of offers, according to one illustrated implementation.

FIG. 18 is a screenshot of the calendar area window of FIG. 17 which depicts selection of a plurality of offers to be accepted as rotators, according to one illustrated implementation.

FIG. 19 is a screenshot of a rotations area window of a seller console which displays a list of offers submitted by buyers for a selected channel and day, according to one illustrated implementation.

FIG. 22 is a screenshot of an order status area window of a seller console which includes status icons next to each order, according to one illustrated implementation.

FIG. 23 is a screenshot of a review credit window of a seller console which provides details for an advertiser including credit limit, credit available, status information, days outstanding, advertiser categories, an agency of record form icon, and a credit application icon, according to one illustrated implementation.

FIG. 26 is a screenshot of an advertiser facing interface which depicts a request for orders for an advertiser of an advertisement platform server processor, according to one illustrated implementation.

FIG. 27 is a screenshot of a media content provider interface which depicts a request for orders for a media content provider of an advertisement platform server processor, according to one illustrated implementation.

DETAILED DESCRIPTION

Figure 1:
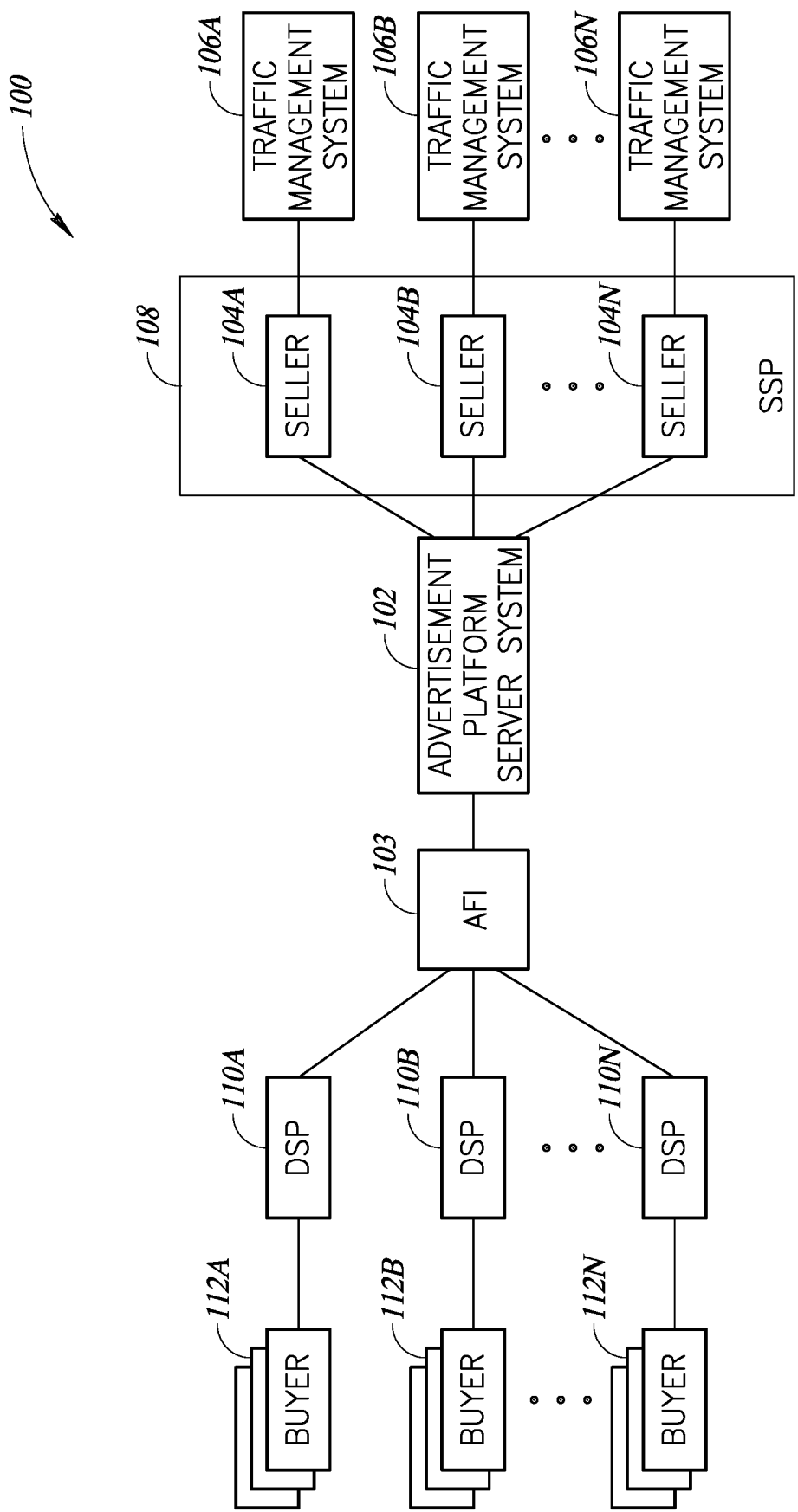
FIG. 1 is a schematic diagram of a networked environment, including an advertisement platform server system communicatively coupled between sellers, such as terrestrial radio or television providers or Webcasters, and buyers, such as advertisers who have advertisements to place or who otherwise control placement of advertisements, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure are directed to computer-implemented systems and methods for providing an autonomous advertisement platform server system where buyers and sellers can trade advertisement inventory programmatically at local, national, and/or worldwide levels.

The types of media traded via the marketplace may simultaneously include numerous types of media, including TV, cable, satellite, radio, outdoor, print, etc. Such programmatic advertising implements data-driven automation of audience-based advertising operations which inverts the industry standard in which marketers rely on show ratings to determine desirable audiences for the marketers' advertisements. Instead, with programmatic, marketers may use audience data to pipe advertising to optimal places. For example, marketers may use programmatic technology to reach a more specific set of consumers regardless of the programs on which the advertisements appear.

The advertisement platform server systems disclosed herein seamlessly blend linear media (e.g., TV, cable, satellite, radio, outdoor, print, digital, streaming) sales practices with data-driven digital advertisement buying methods. In some implementations, the advertisement platform server systems are fully automated seller-controlled advertisement platform server systems which connect media content providers (e.g., broadcasters, Webcasters, digital content providers) with new and existing demand sources and offer revenue management tools for optimizing yields across direct and programmatic channels. Transactions may be demand-led, which allows sellers to view the demand across the sellers' entire landscape of potentially available advertisement inventory. Further, in some implementations, the sellers may autonomously accept or reject bid responses from buyers without revealing price floors or available advertisement opportunities to any of the buyers.

In some implementations, the advertisement platform server systems disclosed herein interface with demand side platforms that make automated media advertisement purchases. Participating sellers enjoy seamless transaction workflow for getting advertisements from proposal, to publishing, and billing that delivers a significant reduction in time spent on reconciliation and "make-goods" and streamlines processes for creative management and revenue management across direct and programmatic sales channels.

The advertisement platform server systems may include a seller side platform (SSP), also referred to herein as a media content provider interface or seller console, for sellers (e.g., broadcasters, Webcasters, printed content providers, digital content providers) and an advertiser-facing interface or console for demand side platform (DSP) entities to interface with the advertisement platform server systems. Through the SSP, sellers can access demand and make advertisement inventory available and accept or reject bid responses based on marketplace demand.

The advertiser-facing interface facilitates creative placement and reviewing for the buy side, and may have transcoding and approval tools for the sell side. For example, in some implementations, once an advertisement transaction is approved, the advertiser-facing interface sends the advertisement directly to a broadcaster's traffic system. In some implementations, the advertisement platform server system is a sell-side powered marketplace, which allows sellers to set price floors and to retain the right to accept or reject any offer which comes through the advertisement platform server system.

In some implementations, the advertisement platform server systems disclosed herein automate aspects of billing, reconciliation, and creative execution. In some implementations, the advertisement platform server systems may be integrated with advertisement management software and sales and traffic management systems.

In one or more implementations disclosed herein, the advertisement platform server systems do not require sellers to offer particular day parts or times when advertisement inventory is available. That is, "carve-outs" are not required. Rather, buyers can extend offers for the entire roster or landscape for a particular channel for a particular period of time (e.g., mediacast day, mediacast week). Thus, sellers may peruse this demand and decide which offers to accept or not to accept.

As discussed further below, in some implementations, the advertisement inventory is bought and sold as canonical inventory units which group similar but discrete advertisement slots together. For example, for linear media an inventory unit may be defined as a specific channel, day and time period (e.g., 30 minutes). When the marketplace opens for a given mediacast day, the marketplace may issue requests for bids (RFBs) for all inventory units for that mediacast day. Buyers may price the inventory units and provide a bid for any of the inventory units. At a daily market close, the advertisement marketplace may notify the buyers of the win/loss outcomes. In some implementations, the demand (e.g., bid responses) may be expressed for future slots but sellers may accept near publishing time (e.g., 10 seconds before airtime, 10 minutes before airtime).

As discussed further below, in some implementations the SSPs disclosed herein allow media providers to evaluate an offer in the context of a market, then autonomously accept or reject the offer based on rules set by the media content provider. Media content providers need only accept offers which are right for their total business, including their yields across their entire inventory (e.g., linear, digital), their audience's experience, and the need to manage channel conflicts with other sales methods (e.g., direct sell).

Using the systems and methods discussed herein, media content providers are able to accelerate revenue and advertising monetization through direct access to an ecosystem of buying partners and their advertising clients who demand local audiences. The systems and methods discussed herein allow media content providers to control precisely what they choose to sell and to maximize revenue across their portfolio, and enables advertisers to achieve more impact and return on investment (ROI) by reaching their targeted audiences. Such features allow for increased revenue by providing seamless access to additional demand sources including national traditional buyers as well as digital buyers, which is seller-controlled through the SSP.

As discussed further below, the SSP of the advertisement platform server system revolves around the broadcaster's SSP dashboard. Seller features in the SSP dashboard include pricing controls, support for rotators, and integrated credit approval. The SSP dashboard also allows sellers to preview and pre-approve the creative associated with marketplace offers. In some implementations, the SSP also incorporates an integrated payment service that automates the process of invoicing and collecting media fees.

As discussed below, one or more implementations of SSPs discussed herein include powerful yield management tools that give participating media content providers the power to retain full control of pricing floors and inventory allocation across non-programmatic (e.g., direct) and programmatic sales channels. The SSP dashboard offers sellers an unprecedented view of marketplace demand with direct sold deals and avails along with placement and exclusion rules.

FIG. 1 shows a networked environment 100 according to one illustrated implementation in which various apparatus, methods and articles described herein may operate. The environment 100 includes an advertisement platform server processor or system 102, an advertiser-facing interface (AFI) 103, a number of sellers or content providers 104A-104N (collectively 104), traffic management systems 106A-106N (collectively 106), a media content provider interface or supply side platform (SSP) 108, a number of demand side platforms (DSPs) 110A-110N (collectively 110), and a number of buyers 112A-112N (collectively 112), all communicatively coupled by one or more networks or other communications channels.

The sellers 104 may take a variety of forms, for example, radio stations or broadcasters, television stations or broadcasters, other terrestrial or satellite broadcasters or multicasters (not shown), Webcasters, printed content (e.g., print media) providers, outdoor content (e.g., billboards) providers, digital content providers (e.g., Web sites, apps), etc., or combinations thereof. The sellers 104 may, or may not, own the content that they provide. The sellers 104 utilize the SSP 108 to access the advertisement platform server system 102 and may use the traffic management systems 106A-106N for traffic management. On the buy side, the buyers 112 (e.g., advertisers, agencies) may interface with the advertisement platform server system 102 via the AFI 103 through the buyers' respective DSPs 110.

Figure 2:
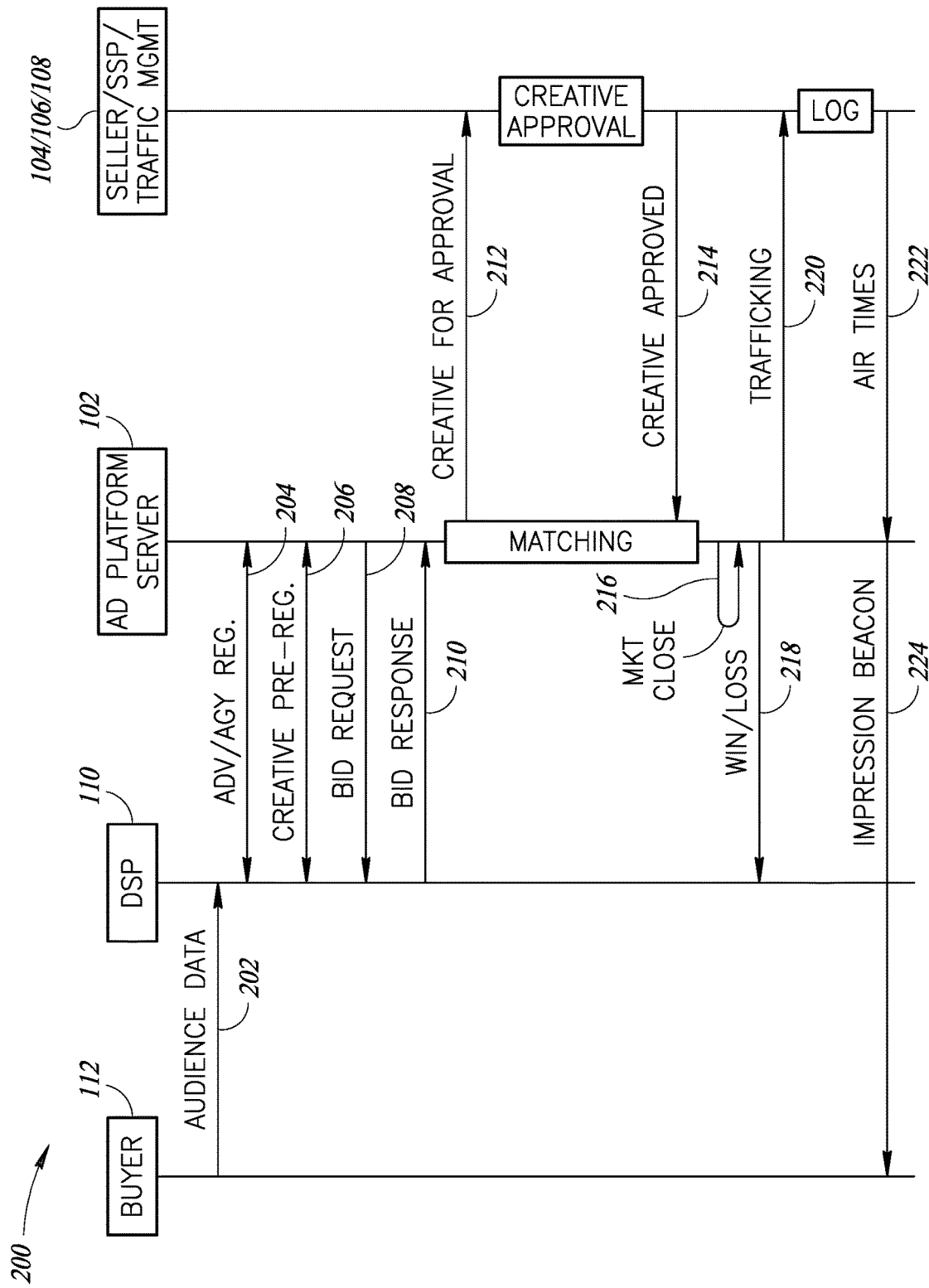
FIG. 2 is a workflow diagram of portions of the networked environment of FIG. 1, showing an example workflow for a transaction utilizing the advertisement platform server system, according to one illustrated implementation.

FIG. 2 shows an example workflow 200 for implementing the advertisement platform server system 102 in the environment 100 of FIG. 1 between a buyer 112, a buyer's DSP 110, the advertisement platform server system 102, and a seller 104 interfacing with the advertisement platform server system 102 through the SSP 108 and the traffic management system 106. Generally, the AFI 103 exposes future advertisement inventory (avails) to DSPs (or trading desks, other ad exchange properties, etc.) which can bid on the entire supply landscape and receive daily win/loss notifications for the inventory (e.g., for the following week).

At 202, the buyer 112 may enter advertising campaign constraints through the DSP 110. Such campaign constraints may include budget, target audience, channels, day parts, etc. The campaign constraints may be cross-media types (e.g., TV, cable, radio, satellite, outdoor, print, digital). At 204, the buyer 112 may send an advertiser and/or agency name mapping to the advertisement marketplace 102 via the DSP 110 based on agencies and advertisers already existing in the advertisement marketplace so that the buyer is associated with an advertiser and/or agency name in the marketplace. At 206, a creative agency associated with the buyer 112 may upload a creative (e.g., advertisement content) which will be used in campaigns through the DSP 110. The DSP 110 may provision the creative to the advertisement marketplace 102, which may download, ingest and validate the creative, and may then send an identifier (e.g., "creative ID") back to the DSP for use in a subsequent bid response.

At 208, the advertisement marketplace 102 may send a request for bids (RFBs) to the DSP 110 for every canonical inventor unit. As noted above, in some implementations, a canonical inventory unit is defined as a time period in a mediacast period of time (e.g., mediacast day) for a particular channel and/or market (e.g., Channel X, Market Y, Nov. 3, 2015, 5:30-6:00 am). The advertisement platform server system 102 may send RFBs for all canonical inventory units in the marketplace for a particular period of time (e.g., day, week). In some implementations, each inventory unit in the advertisement platform server system has a unique channel, market, and time period combination. In some implementations, the advertisement platform server system operates one week ahead of a publication date (e.g., airdate), but other future time windows may also be used.

At 210, the DSP 110 responds to the RFBs provided by the advertisement platform server system 102 with demand for one or more of the inventory units. The DSP 110 may apply targeting criteria prior to issuing bids. In some implementations, the DSP 110 does not need to notify the advertisement platform server system 102 of the targeting data source or attributes used to determine the bids or inventory unit selection.

At 212, the advertisement platform server system 102 validates received bids and begins matching bids with inventory supply. At 214, the SSP 108 pulls creative previews and alerts the seller 104 to possible bids to approve. The seller may approve the creatives and bids and may then send the approvals to the advertisement platform server system 102 for consideration.

At 216, the advertisement platform server system 102 closes the marketplace for the day. The winning spots are sent to the traffic management system 106 for publishing (e.g., airing, printing). At 218, the advertisement platform server system 102 may send a "win" beacon to the DSP 110, which allows the buyer 112 to decrement the buyer's budget through the DSP as needed.

At 220, the seller 104 may process orders through the traffic management system 106. At 222, the seller 104 may reconcile actual air times with the advertisement platform server system 102 through the traffic management system 106.

At 224, the advertisement platform server system 102 may send impression and completion event beacons to the buyer 112 through the DSP 110. Such beacons may be sent after the spot has aired (e.g., up to 30 days later).

In some implementations, before a DSP can win bids, creative should be sent to the advertisement platform server system 102 to be stored in a nontransitory processor-readable storage medium accessible thereby. As noted above, when a creative is submitted by a DSP to the advertisement platform server system 102 through the AFI 103, an identifier is sent back to the DSP. Then, advertisement platform server system 102 ingests the creative and validates that the creative assets meets the technical requirements necessary for the creative to be trafficked and aired successfully. In some implementations, creatives are pre-registered. In such cases, bid responses from DSPs designate a pre-registered creative identifier.

As noted above, for linear media a canonical inventory unit may be defined a specific channel, market, day, and time period (e.g., half hour, one hour). Each canonical inventory unit may include a plurality (e.g., 12-18) of discrete advertisement slots which have a duration that is shorter than the specified time period for the inventory unit. For example, the durations for the advertisement slots may be 15 seconds, 30 seconds, 45 seconds, 60 seconds, 90 seconds, etc., while the specified time period for the canonical inventory unit may be 15 minutes, 30 minutes, 2 hours, etc. The precise time or position of these slots in the corresponding specified time period may or may not be defined at the time of a bid or known by the bidder. Even the seller may not know the precise time or the precise order of the slots prior to publication (e.g., broadcast).

When the marketplace opens for a particular mediacast day, RFBs are issued for all canonical inventory units for the mediacast day. Buyers are able to price the inventory units individually to provide spot bids. At the daily close of the marketplace, the advertisement platform server system 102 notifies buyers 112 through respective DSPs 110 of the win/loss outcomes.

In cases of print media, a canonical inventory unit may be defined in a way such that similar but discrete advertisement slots are grouped together. For instance, for a daily newspaper, a canonical inventory unit may be defined by a section of the newspaper and by date (e.g., Sports section, May 3; Business section, May 6). In such instances, a seller may issue RFBs for all canonical inventory units in a future week of the newspaper.

The advertisement platform server system 102 may operate on a mediacast day schedule, which may vary between sellers (e.g., mediacast stations). Most commonly, mediacast day is from 5:00 AM to 4:59 XM (the next calendar day). The time period from 12:00 AM to 4:59 AM is represented as 12:00 AM to 4:59 XM, wherein the XM indicates that the time period is actually part of the next calendar day.

In some implementations, the advertisement platform server system 102 issues a unique RFB to the DSP 110 for every canonical inventory unit in the landscape (e.g., channels, markets) of the advertisement platform server system for a particular future time period (e.g., one upcoming mediacast day). Once the RFBs are sent to the DSP 110, the DSP may have an opportunity each day to submit a bid for each inventory unit. The availability of inventory may not be revealed to the buyers in these bid requests.

In some implementations, the advertisement platform server system 102 may perform a full landscape sweep on day X for inventory units containing spots which will air on the mediacast day one week later. For example, on a given Monday, the advertisement platform server system 102 may issue RFBs for all inventory units covering the mediacast day for the next Monday. This window may be more or less than one week in other implementations.

In some implementations, the advertisement platform server system 102 may allow DSPs to express demand (i.e., bids) for days beyond a single day one week ahead of the current day. For example, a DSP may wish to see RFBs on a rolling mediacast week basis. In such cases, the advertisement platform server system 102 may issue RFBs on a given Monday for all canonical inventory units for the next Monday through the next Sunday. Then, on Tuesday of the same week, the advertisement platform server system 102 may issue RFBs for all canonical inventory units for the next Tuesday through the next Monday, and so on. This configuration allows the DSP 110 to have more chances to bid on inventory units throughout the week, which can help fine tune bidding strategies and may facilitate campaign pacing.

Once all of the daily bids are collected, the advertisement platform server system 102 matches offers with inventory supply and generates orders that are integrated with the traffic management system 106. At this point, the bid status for each bid may be classified as Win, Loss, or Hold. The Win bid status indicates the offer has been accepted by seller for a specific canonical inventory unit. The Loss bid status indicates the offer was declined by seller, and may specify one or more loss reason codes. The Hold bid status indicates the offer has been accepted by the seller as part of a rotator. In some implementations, all bids in a rotator are set to the lowest bid rate in a particular grouping.

In some implementations, the system may run an auction for all received programmatic offers for an inventory unit. As non-limiting examples, each auction may include an auction reserve price which is one of: a minimum offer price for one or more offers received through the at least one non-programmatic sales channel, a maximum offer price for one or more offers received through the at least one non-programmatic sales channel, or an average offer price for one or more offers received through the at least one non-programmatic sales channel. In some implementations, the auction may include a first price descending auction in which the advertiser is charged a price offered by the advertiser. In some implementations, the auction may include a second price descending auction in which the advertiser is charged a price of a next highest offer price. In some implementations, the auction may include a multi-lot second price auction in which all available slots in the advertisement placement opportunity are sold for the same price which is the lowest price offered which qualifies to win.

In some implementations, automatic acceptances and/or automatic rejections may be based on conclusions from an automated system which uses historical offer data to estimate how individual offers for an advertisement opportunity are best placed for any slot versus other potential slots in which the individual offers for an advertisement opportunity may be placed.

Given the nature of the advertisement platform server system 102 operations, budget management may be more complex than in a digital advertisement ecosystem. To facilitate budget management and to assist DSPs with expressing enough demand to meet their campaign objectives given the challenges introduced by the bid feedback latency, the advertisement platform server system 102 may utilize "bid group objects." Each bid response can include a bid group object. A bid group object is a budget cap and/or a maximum spot wins constraint that can be assigned across multiple bids (and multiple media types) to avoid overspending/over-winning during the feedback window. These budget caps and/or maximum spot wins may operate in a "first triggered" model, meaning that no more bids will be permitted to win after the budget cap or maximum spots cap are hit.

For example, the DSP 110 may group all bids for one campaign, for one day, into a bid group with a budget cap for the day. Then, the DSP 110 may issue bids for orders of magnitude more inventory and/or cost (e.g., $1,000,000) than the budget (e.g., $10,000) will support. The budget cap protects the buyer from winning all of the bids, which would exceed the budget. Thus, a buyer may issue bids as though the buyer has an "infinite budget" without the risk of exceeding the buyer's actual budget. Using such functionality, buyers can place bids in parallel without having to iteratively place bids, wait and see which bids are accepted, and place additional bids to fulfill their budget for a campaign. Such functionality also avoids the need for buyers to model acceptance rates to determine how much over the budget the buyer can safely bid without exceeding the budget. Depending on the accuracy of such model of acceptance rates and how aggressive a buyer is placing bids, there is the potential for the buyer to exceed the budget if the actual acceptance rate is higher than expected or for less than the budget to be spent if the actual acceptance rate is lower than expected. Such issues are avoided by use of the bid groups discussed above.

As another example, the DSP 100 may group all bids for a particular channel into a bid group object and set a maximum spot cap which limits the number of spots which will be purchased for the channel. Such feature may allow for "smoothing" a campaign across multiple channels and/or times without overly concentrating the buyer's budget on a particular market, affiliate, period of time, media outlet, geographical area, group of consumers, etc. As an example, a maximum spot cap may be established which limits the frequency which an advertisement is provided to the same group of consumers. The group of consumers may be determined statistically (e.g., by station times, programming) so that a particular advertisement is not provided to the same group of consumers more than N times over a time period.

Figure 3:
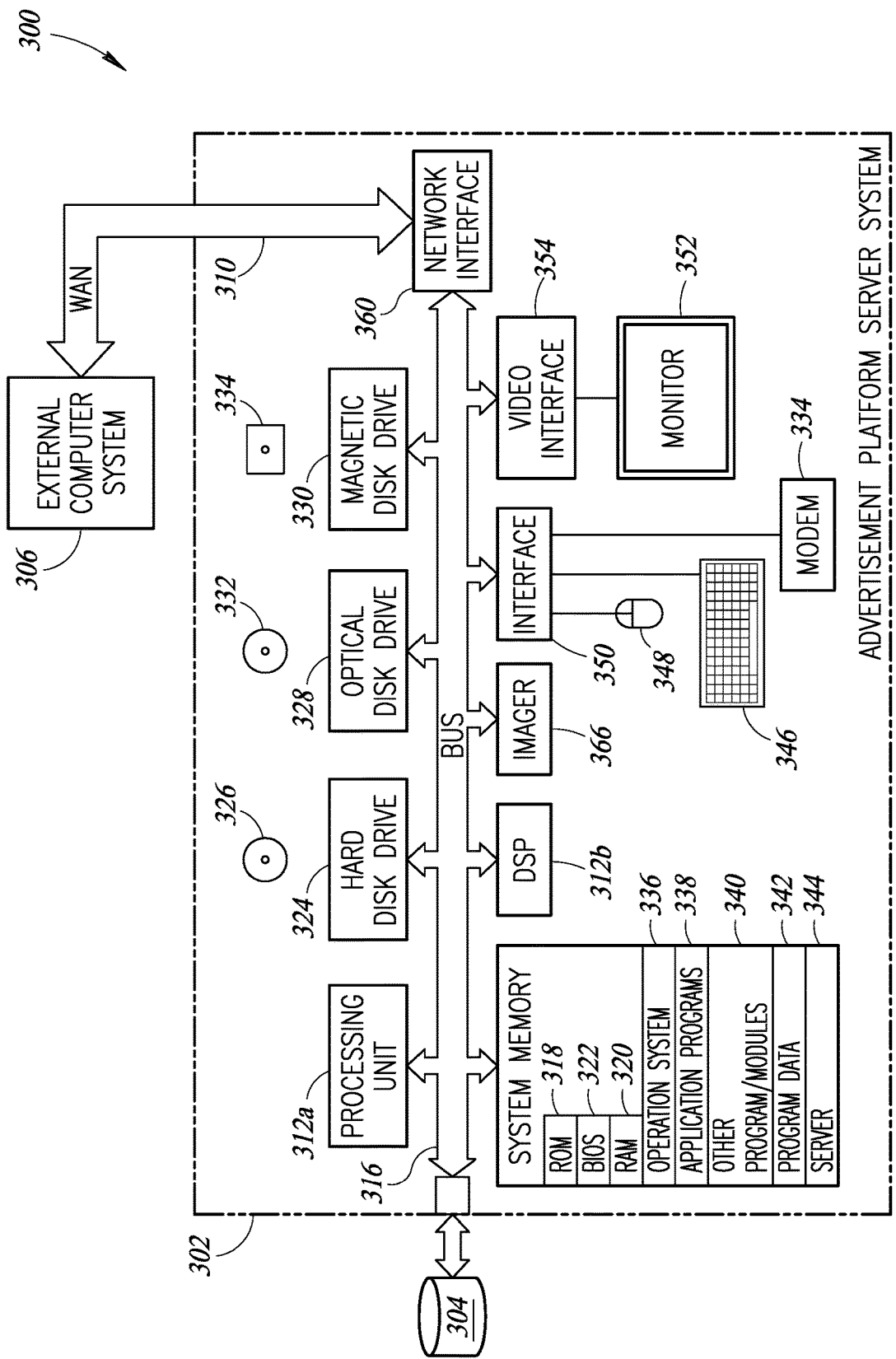
FIG. 3 is a schematic diagram of various components of an advertisement platform server system, according to one illustrated implementation.

FIG. 3 shows a networked environment 300 comprising one or more advertisement platform server systems 302 (only one illustrated) and one or more associated nontransitory computer- or processor-readable storage medium 304 (only one illustrated). The associated nontransitory computer- or processor-readable storage medium 304 is communicatively coupled to the advertisement platform server system(s) 302 via one or more communications channels, for example, one or more parallel cables, serial cables, or wireless channels capable of high speed communications, for instance, via FireWire®, Universal Serial Bus® (USB) 2 or 3, Thunderbolt®, and/or Gigabit Ethernet®.

The networked environment 300 also includes one or more external processor-based computer systems 306 (only one illustrated). For example, the external processor-based systems 306 may be representative of a processor-based system associated with an SSP 108 or a DSP 110 of FIG. 1. The external processor-based systems 306 are communicatively coupled to the advertisement platform server system(s) 302 by one or more communications channels, for example, one or more wide area networks (WANs) 310, for instance the Internet or Worldwide Web portion thereof.

The networked environment 300 may employ other computer systems and network equipment, for example, additional servers, proxy servers, firewalls, routers and/or bridges. The advertisement platform server systems 302 will at times be referred to in the singular herein, but this is not intended to limit the implementations to a single device since in typical implementations there may be more than one advertisement platform server systems 302 involved. Unless described otherwise, the construction and operation of the various blocks shown in FIG. 3 are of conventional design. As a result, such blocks need not be described in further detail herein, as they will be understood by those skilled in the relevant art.

The advertisement platform server systems 302 may include one or more processing units 312a, 312b (collectively 312), a system memory 314 and a system bus 316 that couples various system components, including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the advertisement platform server system(s) 302, such as during start-up.

The advertisement platform server systems 302 may include a hard disk drive 324 for reading from and writing to a hard disk 326, an optical disk drive 328 for reading from and writing to removable optical disks 332, and/or a magnetic disk drive 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processing unit 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the advertisement platform server system 302. Although the depicted advertisement platform server systems 302 is illustrated employing a hard disk 324, optical disk 328 and magnetic disk 330, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 314, such as an operating system 336, one or more application programs 338, other programs or modules 340 and program data 342. The system memory 314 may also include communications programs, for example, a server 344 that causes the advertisement platform server system 302 to serve electronic information or files via the Internet, intranets, extranets, telecommunications networks, or other networks as described below. The server 344 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 3 as being stored in the system memory 314, the operating system 336, application programs 338, other programs/modules 340, program data 342 and server 344 can be stored on the hard disk 326 of the hard disk drive 324, the optical disk 332 of the optical disk drive 328 and/or the magnetic disk 334 of the magnetic disk drive 330.

An operator can enter commands and information into the advertisement platform server system(s) 302 through input devices such as a touch screen or keyboard 346 and/or a pointing device such as a mouse 348, and/or via a graphical user interface. Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The advertisement platform server system(s) 302 can include other output devices, such as speakers, printers, etc.

The advertisement platform server systems 302 can operate in a networked environment 300 using logical connections to one or more remote computers and/or devices. For example, the advertisement platform server systems 302 can operate in a networked environment 300 using logical connections to one or more external processor-based systems 306. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the advertisement platform server systems 302 and external processor-based systems 306.

Figure 4:
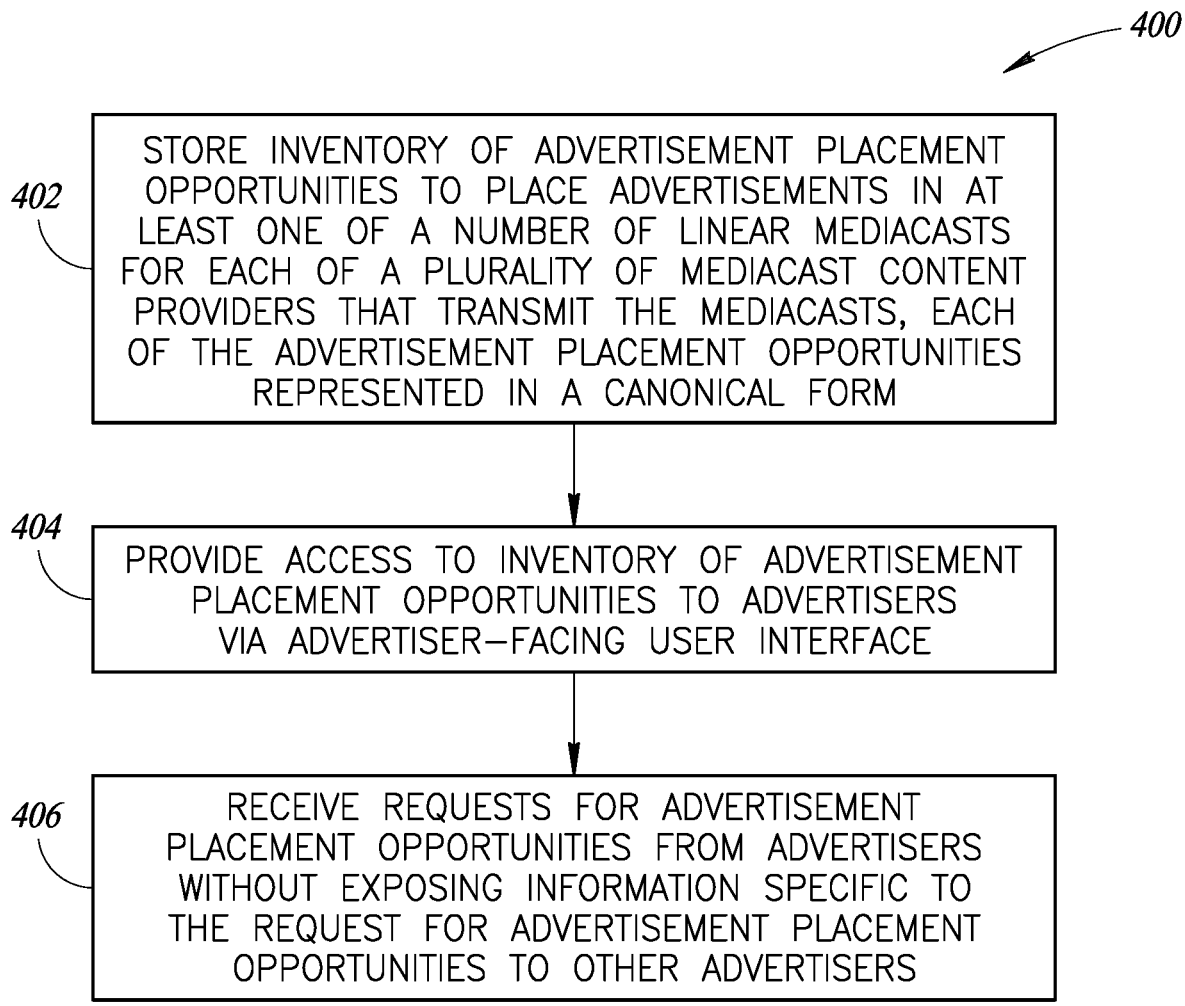
FIG. 4 shows a method of operating an advertisement platform server system to automate placement of advertisements in linear mediacasts, according to one illustrated implementation.

FIG. 4 shows a method 400 of operating an advertisement platform server system to automate advertisement placement in linear mediacasts (e.g., broadcasts, Webcasts). At 402, at least one processor of the advertisement platform server system may store, in at least one nontransitory processor-readable storage medium thereof, an inventory of advertisement placement opportunities to place advertisements in at least one of a number of linear mediacasts for each of a plurality of mediacast content providers that transmit the mediacasts.

Each of the advertisement placement opportunities ("avails") may be represented in a canonical form that specifies at least a respective period of time (e.g., 15 minutes, 30 minutes, 1 hour) of the advertisement placement opportunity during a mediacast day of the mediacast content provider. For example, each inventory unit may correspond to a specific 30 minute window of a mediacast day of the mediacast content provider. Each of the advertisement placement opportunities may include a plurality (e.g., 12-18) of slots in the respective period of time of the advertisement placement opportunity. In some implementations, at least some of the plurality of slots have a duration shorter than the specified period of time of the respective advertising placement opportunity.

In some implementations, the canonical form of at least some of the advertisement placement opportunities in the inventory specifies the respective period of time of the advertisement placement opportunity by at least two of: i) a start time of the respective advertisement placement opportunity, ii) an end time of the respective advertisement placement opportunity, and iii) a duration of the respective advertisement placement opportunity. In some implementations, the canonical form of at least some of the advertisement placement opportunities in the inventory specifies a day of the week of the advertising placement opportunity. The canonical form of at least some of the advertisement placement opportunities in the inventory may specify at least one of a network, a network affiliate, or a channel of the advertising placement opportunity. In some implementations, the canonical form represents the advertising placement opportunity without specification of any asking price by the mediacast content provider for any slot in the respective advertising placement opportunity. In some implementations, the canonical form of at least some of the advertisement placement opportunities in the inventory represents the advertising placement opportunity without specification of either a specific start time or a specific end time for any of the respective slots of the advertising placement opportunity.

In some instances, the canonical form of inventory units may vary based on media type. For instance, TV, satellite, cable, digital and outdoor billboards may utilize a canonical form defined by time period (e.g., 30 minutes), while print media may utilize a canonical form defined by sections (e.g., table of contents, feature article, back cover) of a publication and/or defined by two dimensional areas (e.g., ½ page, 1 page) of a publication.

At 404, the at least one processor of the advertisement platform server system may provide access to the inventory of advertisement placement opportunities to advertisers via an advertiser-facing interface (AFI). As discussed above, DSPs may access the AFI to view inventory units across a media content provider's landscape for a particular period of time (e.g., a mediacast day). In some implementations, the at least one processor of the advertisement platform server system may provide access to the inventory of advertisement placement opportunities to advertisers without specification of any asking price by the mediacast content provider for any slot in the respective advertising placement opportunity. In some implementations, the at least one processor of the advertisement platform server system may provide access to the inventory of advertisement placement opportunities to advertisers without revealing of a total number of slots available in the respective advertising placement opportunity to any of the advertisers.

At 406, the at least one processor of the advertisement platform server system may receive, via the AFI, requests for advertisement placement opportunities from one or more advertisers without exposing information specific to the request for advertisement placement opportunities to other advertisers. Each request may be a request for at least one undisclosed slot in one of the advertisement placement opportunities. For example, an advertisement placement opportunity may be for a specific channel, on a specific day, and during a specified 30 minute time window. A buyer may place a bid for the advertisement placement opportunity which purchases a slot (e.g., a 30 second slot) within the specified 30 minute time window.

The at least one processor of the advertisement platform server system may receive the requests for advertisement placement opportunities from one or more advertisers without exposing information specific to the request for advertisement placement opportunities to mediacast content providers other than a respective mediacast content provider that provides the respective mediacast that includes the respective requested advertisement placement opportunity. In some instances, the at least one processor of the advertisement platform server system may provide a mediacast content provider-facing user interface that receives requests for advertisement placement opportunities from one or more advertisers without exposing information that identifies a price offered for the respective advertisement placement opportunity to any other ones of the advertisers.

Figure 5:
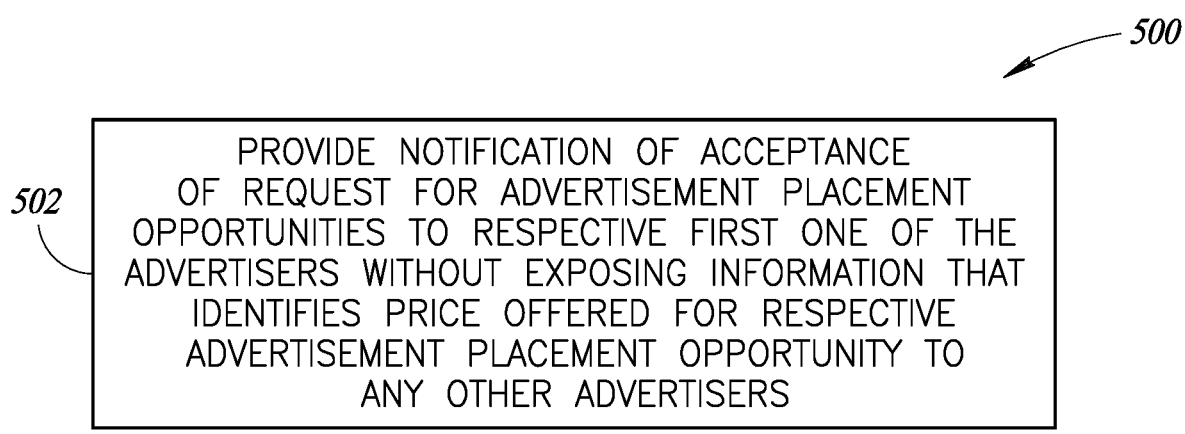
FIG. 5 shows a method of operating an advertisement platform server system, according to one illustrated implementation, which may be employed in performing the method of FIG. 4.

FIG. 5 shows a method 500 of operating an advertisement platform server system, according to one illustrated implementation. The method 500 may be employed in performing the method 400 (FIG. 4).

At 502, the at least one processor of the advertisement platform server system provides notification of an acceptance of a request for advertisement placement opportunities to a respective first one of the advertiser without exposing information that identifies a price offered for the respective advertisement placement opportunity to any other ones of the advertisers.

FIG. 6 shows a method 600 of operating an advertisement platform server system, according to one illustrated implementation. The method 600 may be employed in performing the method 400 (FIG. 4).

At 602, the at least one processor of the advertisement platform server system implementing a budget capping that prevents acceptance of requests from the advertiser once an advertiser specified budget for a defined campaign is exceeded by acceptance by the mediacast content providers of other requests by the advertiser for the defined campaign.

FIG. 7 shows a method 700 of operating an advertisement platform server system, according to one illustrated implementation. The method 700 may be employed in performing the method 400 (FIG. 4).

At 702, the at least one processor of the advertisement platform server system implements a smoothing that prevents acceptance of requests from the advertiser once an advertiser specified maximum concentration for a defined campaign is exceeded by acceptance by the mediacast content providers of other requests by the advertiser for the defined campaign.

FIG. 8 shows a method 800 of operating an advertisement platform server system, according to one illustrated implementation. The method 800 may be employed in performing the method 400 (FIG. 4).

At 802, the at least one processor of the advertisement platform server system implements a daily close of all advertisement placement opportunities pertaining to a given mediacast day, requests for advertisement placement opportunities pertaining to the given mediacast day, and acceptances of requests for advertisement placement opportunities pertaining to the given mediacast day.

Figure 9:
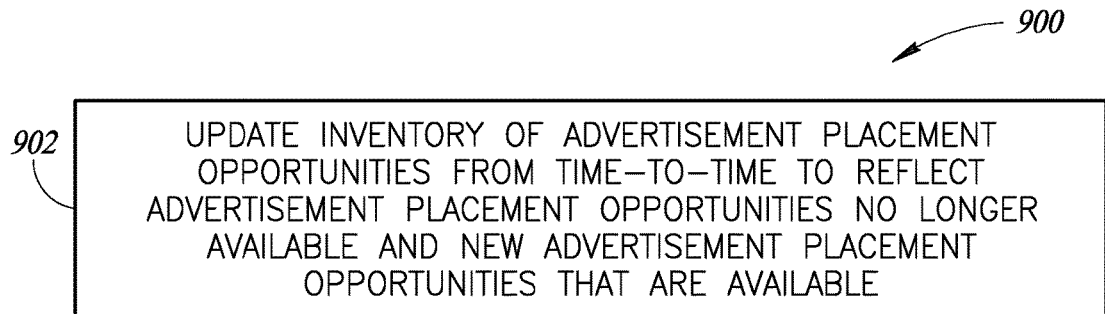
FIG. 9 shows a method of operating an advertisement platform server system, according to one illustrated implementation, which may be employed in performing the method of FIG. 4.

FIG. 9 shows a method 900 of operating an advertisement platform server system, according to one illustrated implementation. The method 900 may be employed in performing the method 400 (FIG. 4).

At 902, the at least one processor of the advertisement platform server system updates the inventory of advertisement placement opportunities from time-to-time to reflect advertisement placement opportunities no longer available and new advertisement placement opportunities that are available.

Figure 10:
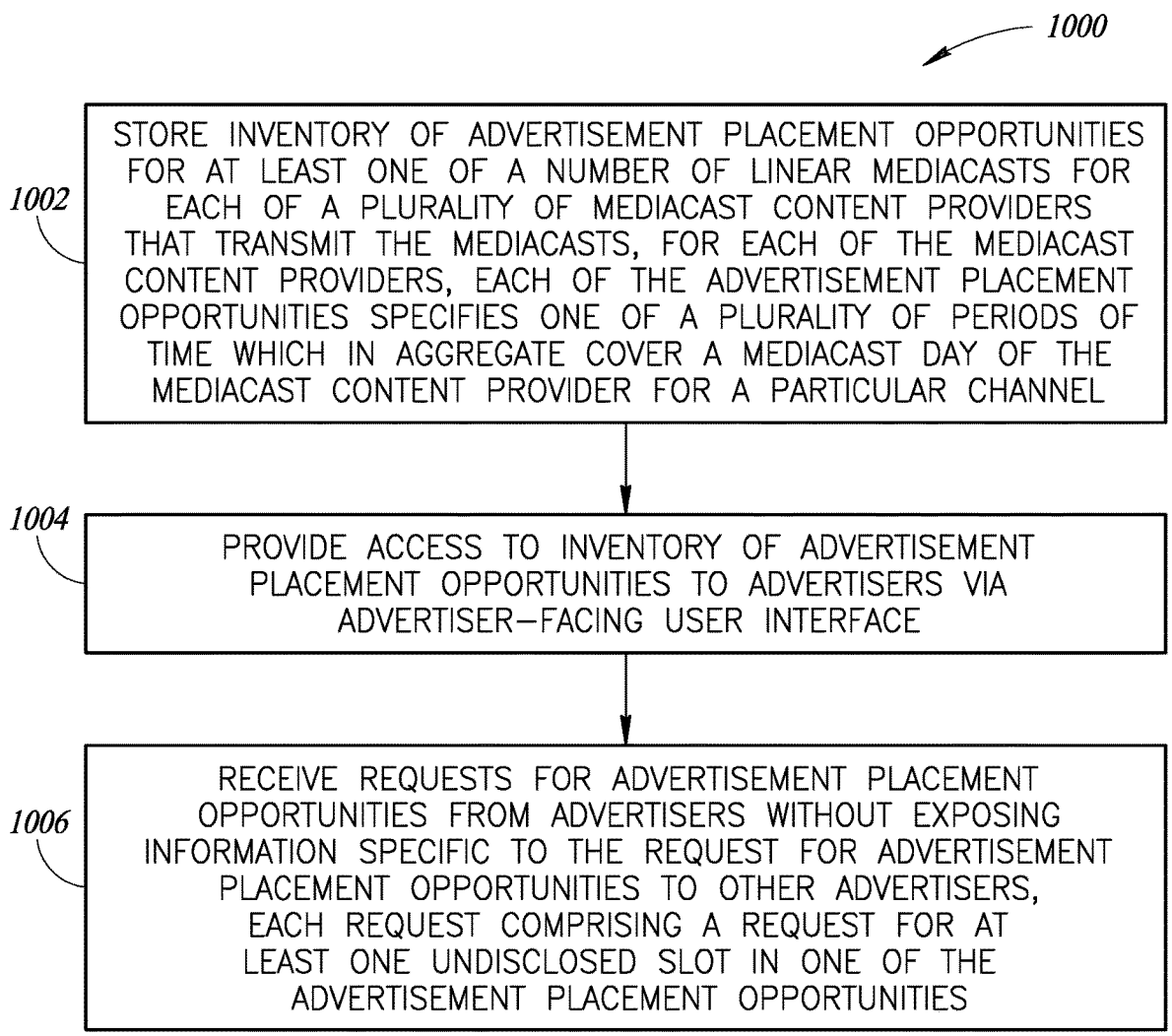
FIG. 10 shows a method of operating an advertisement platform server system to automate placement of advertisements in linear mediacasts, according to one illustrated implementation.

FIG. 10 shows a method 1000 of operating an advertisement platform server system to automate advertisement placement in linear mediacasts (e.g., broadcasts, Webcasts). At 1002, at least one processor of the advertisement platform server system may store in at least one nontransitory processor-readable storage medium an inventory of advertisement placement opportunities to place advertisements in at least one of a number of linear mediacasts for each of a plurality of mediacast content providers that transmit the mediacasts via mediacast channels. For each mediacast channel of each of the mediacast content providers, each of the advertisement placement opportunities may specify one of a plurality of periods of time which in aggregate cover a mediacast day of the mediacast channel. Each of the advertisement placement opportunities may include a plurality of slots in the respective period of time of the advertisement placement opportunity. In some instances, at least some of the plurality of slots have a duration shorter than the specified period of time of the respective advertising placement opportunity.

At 1002, the at least one processor of the advertisement platform server system may provide access to the inventory of advertisement placement opportunities to advertisers via an advertiser-facing interface.

At 1004, the at least one processor of the advertisement platform server system may receive, via the advertiser-facing interface, requests for advertisement placement opportunities from one or more advertisers without exposing information specific to the request for advertisement placement opportunities to other advertisers. Each request may include a request for at least one undisclosed slot in one of the advertisement placement opportunities.

Figure 11:
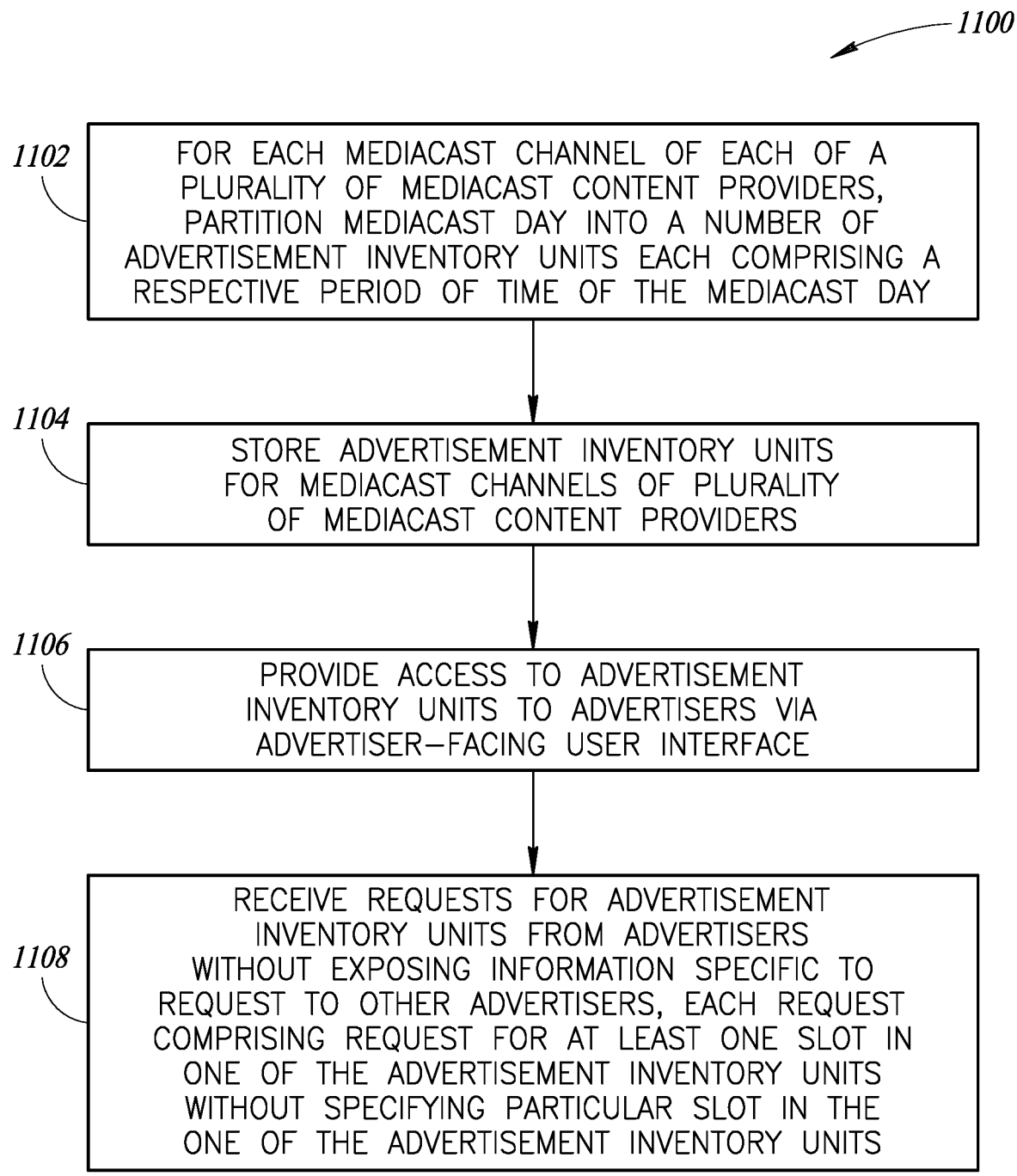
FIG. 11 shows a method of operating an advertisement platform server system to automate placement of advertisements in linear mediacasts, according to one illustrated implementation.

FIG. 11 shows a method 1100 of operating an advertisement platform server system to automate advertisement placement in linear mediacasts (e.g., broadcasts, Webcasts). At 1102, at least one processor of the advertisement platform server system may, for each mediacast channel of each mediacast content provider, partition a mediacast day into a number of advertisement inventory units. Each of the number of advertisement inventory units may correspond to a respective period of time of the mediacast day and may include a plurality of advertisement slots.

At 1104, the at least one processor of the advertisement platform server system may store in at least one nontransitory processor-readable storage medium the advertisement inventory units for each of the mediacast channels of the plurality of mediacast content providers.

At 1106, the at least one processor of the advertisement platform server system may provide access to the advertisement inventory units to advertisers via an advertiser-facing interface.

At 1108, the at least one processor of the advertisement platform server system may receive, via the advertiser-facing interface, requests for advertisement inventory units from one or more advertisers without exposing information specific to the request to other advertisers. Each request may include a request for at least one slot in one of the advertisement inventory units without specifying a particular slot in the one of the advertisement inventory units.

Figure 12:
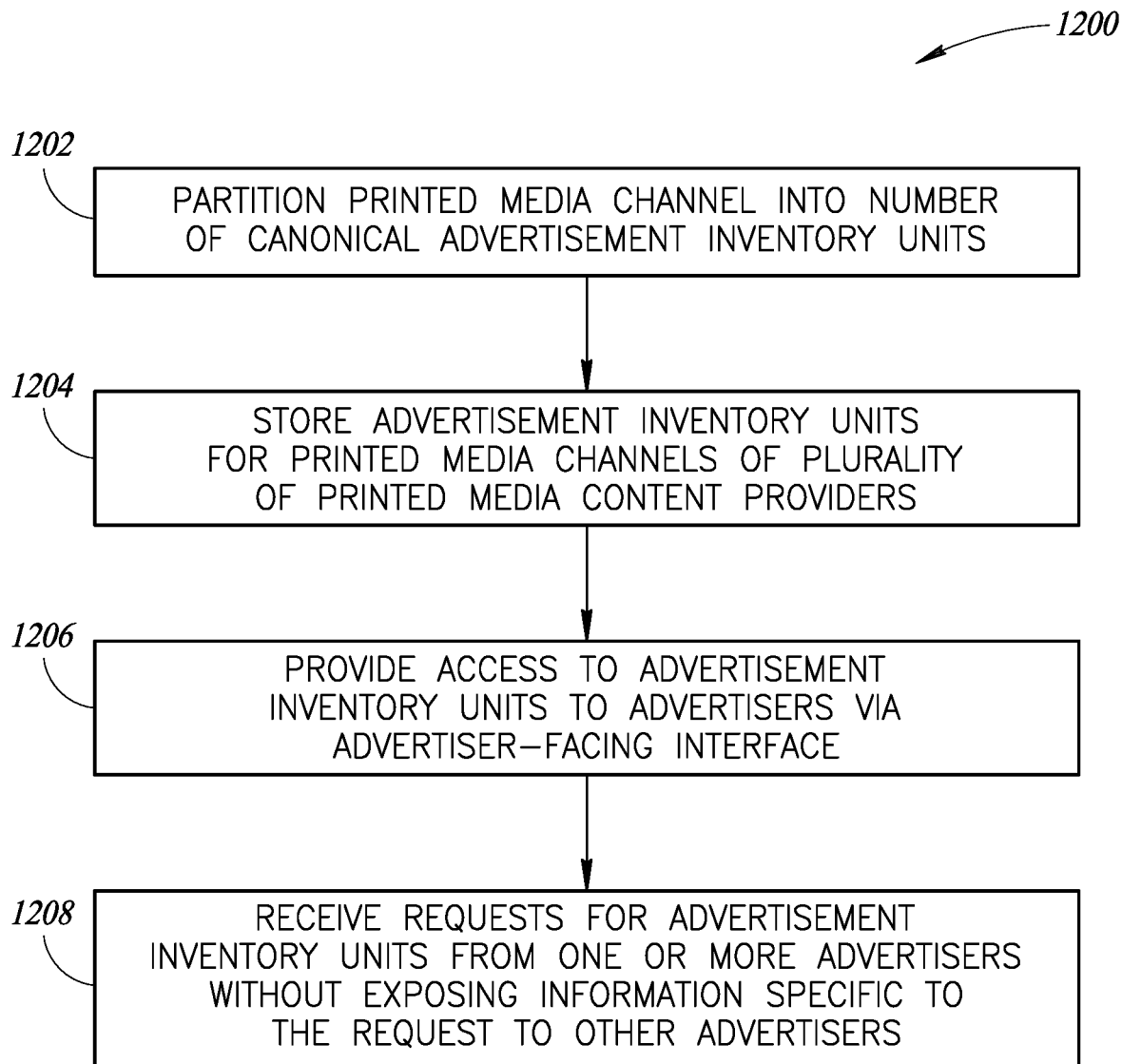
FIG. 12 shows a method of operating an advertisement platform server system to automate placement of advertisements in printed media channels, according to one illustrated implementation.

FIG. 12 shows a method 1200 of operating an advertisement platform server system to automate advertisement placement in printed media (e.g., newspapers, magazines, books, signs). The method 1200 may be executed in conjunction with and by the same advertisement platform server system which performs any of the methods discussed above.

At 1202, at least one processor of the advertisement platform server system may, for each printed media channel of each printed media content provider, partition the printed media channel into a number of canonical advertisement inventory units. Each of the number of advertisement inventory units may be defined by a respective portion of the printed media channel and may include a plurality of advertisement slots. For instance, in the case of a magazine, each canonical inventory unit may define a particular section (e.g., table of contents, feature stories, letters to the editor) of the magazine and a particular publication date, and each inventory unit may include multiple advertisement slots.

At 1204, the at least one processor of the advertisement platform server system may store in at least one nontransitory processor-readable storage medium the advertisement inventory units for each of the printed media channels of the plurality of printed media content providers.

At 1206, the at least one processor of the advertisement platform server system may provide access to the advertisement inventory units to advertisers via an advertiser-facing interface.

At 1208, the at least one processor of the advertisement platform server system may receive, via the advertiser-facing interface, requests for advertisement inventory units from one or more advertisers without exposing information specific to the request to other advertisers. Each request may include a request for at least one slot in one of the advertisement inventory units without specifying a particular slot in the one of the advertisement inventory units.

As discussed above, the advertisement marketplace or exchange system 100 (FIG. 1) includes a seller console or SSP 108 which allows sellers to preview creative, view and accept offers, create orders, and send orders to a traffic management system for publishing (e.g., broadcast). Before the seller console is utilized for recurring activities, sellers may complete a setup process which includes enabling channels and billing groups in the traffic management system and creating a programmatic agency in the traffic management system.

The setup process may also include configuring channels in the seller console so that the channels are available for buyers to target when creating campaigns. In some implementations, the seller may configure a new channel by indicating the following marketplace fields for a channel: name, affiliation, Nielsen call letters, video definition, media type and sign on. The name of the channel is how the channel will be displayed on all screens viewable by buyers and sellers. The affiliation is the broadcasting network with which the channel is affiliated. Such association may be used by buyers to target channels with specific affiliates. The video definition is the media definition which the channel supports (e.g., high definition, standard definition). The media type is the type of media which airs on the channel, such as broadcast TV, cable network, radio, satellite, etc. The "sign on" field is the time of the mediacast day. In some implementations, the sign on field defaults to 12:00 AM but should be updated to match the sign on time of the channel in the traffic management system.

The seller may also setup various fields which relate to the traffic management system. As an example, such fields may include: Central Property, Electronic Contract (EC) name, Send Orders, Traffic Channel, and Use Single Inventory Code. The EC Name is the name that matches the EC Name on the channel in the traffic management system. The EC name may be stamped on each line of the order in the traffic management system. Regarding the Send Orders field, when an offer is accepted, the seller can either send the order to the traffic management system manually, automatically send the order immediately, or automatically send the order right after the daily marketplace close. The Traffic Channel field specifies the channel in the traffic management system. The Material Group field identifies the material group in the traffic management system that the seller wants to use for this channel. Regarding the Use Single Inventory Code field or checkbox, if a single inventory code is being used in the traffic management system for all orders received from the marketplace, this box may be checked or otherwise selected so that inventory code mapping only has to be created once. Such allows orders to be automatically imported.

The seller console may also allow the seller to select the priority codes which are eligible to be preempted by programmatic spots. For example, if a spot in a time block is already filled in the traffic management system, an accept rule may only accept a programmatic spot if the spot in the traffic management system has a selected priority code which indicates the spot is preemptible.

Figure 17:
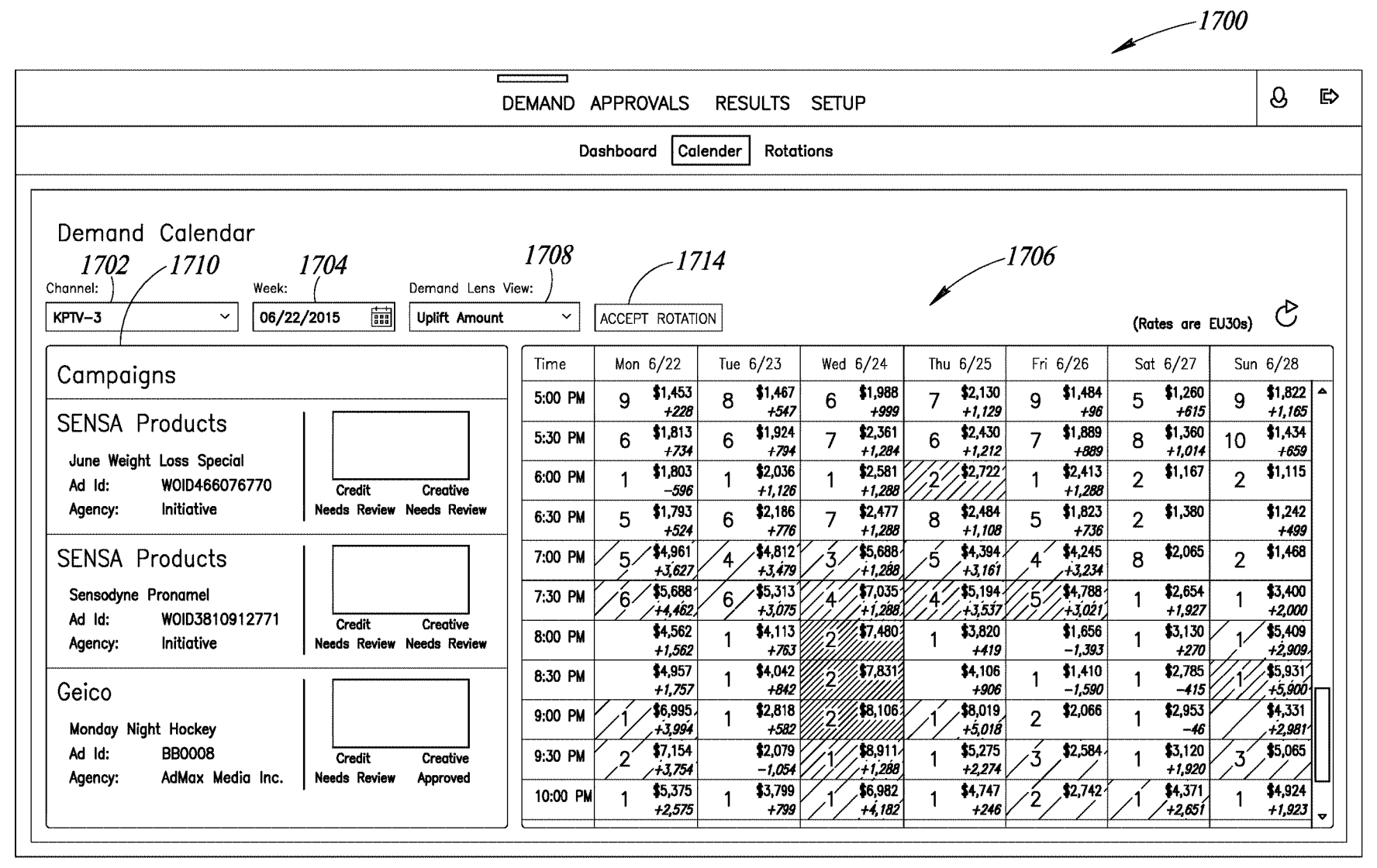
Figure 18:
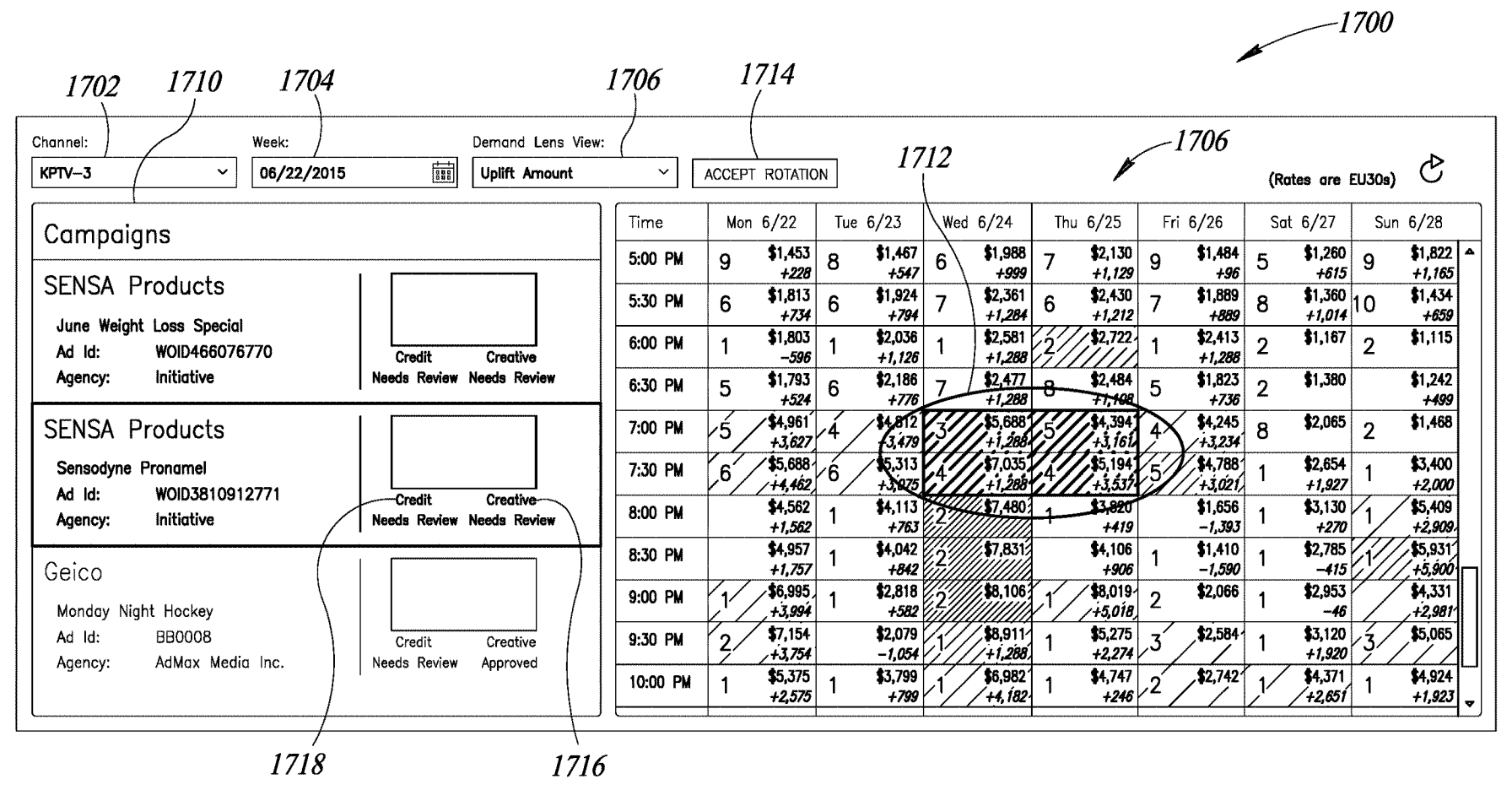

During setup of the seller console, the seller may also configure the revenue method the seller wants the system to utilize when showing the seller uplift (e.g., how much higher a programmatic offer is compared to spots booked through other sales channels) on a color-coded calendar-based heat map (see FIGS. 17-18). Such revenue methods may include average, maximum, average preemptible, maximum preemptible, and lowest, for example. For the lowest, average, and highest revenue methods, the acceptance rules and the calendar area are based on the lowest, average, and highest rates, respectively, of all placed spots in each half hour block in the traffic management system. For the average preemptible revenue method and the highest preemptible method, the acceptance rules and the calendar area are based on the average and highest rate, respectively, of only the preemptible spots in each half hour block in the traffic management system. Preemptible spots may be determined based on the selected priority codes, as discussed above.

Once the seller has setup the seller console, the seller console may be used for recurring activities.

FIG. 13 shows a new direct response avail window 1300 which allows a seller to define a new direct response avail time. Generally, if there are specific times on a channel's log where direct response (DR) inventory can be placed and the seller wants to receive bids for DR inventory, the seller may define times and days via the new direct response avail window 1300 in the seller console.

The new direct response avail window 1300 may include three tabs: a description tab 1302, a pricing tab 1304, and a reserve rule tab 1306. Fields under the description tab 1302 are shown in FIG. 13. In the description tab 1302, the seller may select a name 1308, program notes 1310, channel 1312, start time 1314, end time 1316, days 1318, and acceptable unit lengths 1320.

Under the pricing tab 1304, the seller may define a date range for the rule and the percentage higher ("increase") the DR offer must be to be accepted over already booked inventory. The seller may also define the minimum acceptable rate ("floor"), the maximum spots which will be accepted for the week for the rule ("Max Units per Order"), and whether the seller wants to have a set floor ("ask") price or increase the floor ("ask") based on the lowest placed rate.

Under the reserve rule tab 1306, the seller may set the number of offers which are held for the avail and may choose whether the seller wants to increase the floor if the number of held offers is exceeded.

Once the new DR avail has been setup, buyers may then request avails and the times defined by the seller are returned to the buyers. Buyers may then submit offers for the defined DR avail times. The offers may be held in a "holding tank" which may be used to fill open capacity. For example, the offers may be ranked by rate and selected in a manner which maximizes revenue for the seller.

Figure 14:
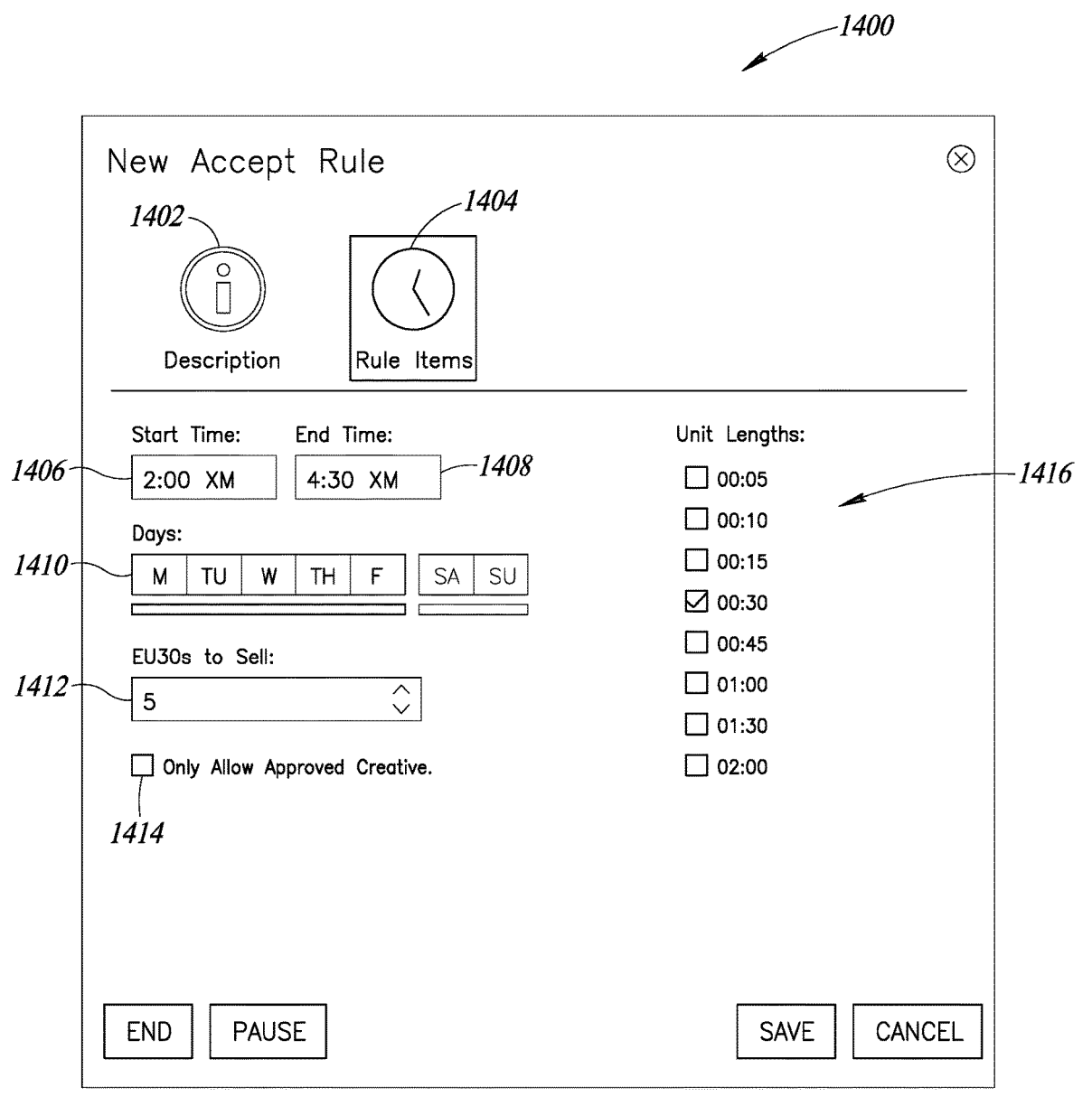

FIG. 14 shows a new accept rule window 1400 which includes a description tab 1402 and a rule items tab 1404. To avoid having to manually accept offers, the seller may create auto-acceptance rules which execute every evening on marketplace close (e.g., 4:00 PM) and may autonomously accept offers which match the rule parameters. Using auto-acceptance rules may be optional, which allows sellers to manually accept all offers if desired.

To setup a new auto-acceptance rule, the seller may select the description tab 1402 in the new accept rule window 1402. The seller may then enter a description, channel, start time, end time, days, and the minimum amount that will be accepted for the rule (floor).

On the rule items tab 1404, the seller may set a start time 1406, end time 1408, eligible days 1410, the number of 30-second spots to sell (EU30s to sell) 1412, whether to allow non-approved creative 1414, and acceptable spot lengths 1416. Regarding the number of EU30s to sell, the rule will stop executing after this number has been met.

The auto-acceptance rules may be simple rules or may include complex rules or groups of rules. For example, an auto-acceptance rule may specify that an offer is to be accepted if the offer is from a particular advertiser (or group of advertisers) and the offer is one of the top three offers received, or if the offer is within a certain percentage of the highest offer received, or if the offer is within a certain dollar amount of the highest offer received, etc.

The seller may also setup auto-rejection rules. Auto-rejection rules may be used to automatically reject offers from specific advertisers (e.g., advertisers which have made offers via another sales channel). Once the auto-rejection rule is set, sellers will not see offers from the chosen advertiser(s) or offers that are rejected using one or more auto-rejection rules. Using auto-rejection rules is optional. That is, seller may simply manually reject offers or just ignore offers which they do not want to accept.

The auto-acceptance and auto-rejection rules may be set based on a hierarchical permissions scheme. For example, a finance lead of a seller may set a price floor so that offers below the price floor are not seen by sales personnel. Generally, such a permissions scheme may be used by the seller to control the amount of decision making authority that is given to various personnel.

The activities which may be completed on a daily or recurring basis include: pre-approving creative, reviewing and accepting offers, sending orders to the traffic management system, importing and processing orders in the traffic management system, monitoring activity in the marketplace, and invoicing and collecting. Each of these activities is discussed below with reference to FIGS. 15-22.

FIG. 15 shows a creative area window 1500. When an offer is submitted, creative is submitted with the offer and displays in the creative area window 1500. The media types for the creatives may be any suitable media types. For example, for TV, media types may include MPEG, ProRes, Avid, etc.

If the seller is using auto-acceptance rules to accept offers, the seller should pre-approve creative before the marketplace closes for the day. If the seller is manually accepting offers, the seller may choose whether to pre-approve creative or not. Creative may also be approved during manual offer acceptance.

To pre-approve a creative, the user may select an approvals tab 1502 in the creative area window 1500. The user may then select a review icon 1504 next to a particular creative, which causes a review creative window to display. The user may then review the creative and watch a preview of the creative. The user may then approve or reject the creative.

Once the seller's channels have been enabled and configured, buyers will begin submitting offers for those channels. Offers may be reviewed and accepted or rejected in several different ways, including: reviewing offers from a dashboard window 1600 shown in FIG. 16, reviewing and accepting offers from a calendar area window 1700 shown in FIGS. 17 and 18, reviewing and accepting offers from a rotations area window 1900 shown in FIG. 19, automatically accepting offers using rules, or automatically reject offers using rules.

As shown in FIG. 16, the dashboard area window 1600 displays a list 1601 of channels which have offers for the upcoming week. The user may select a calendar icon 1602 next to a channel to view the offers which have been submitted for that channel in a calendar view of the next week, broken into half hour blocks in the calendar area window 1700 (FIGS. 17 and 18). The user may also select a rotations icon 1604 next to a channel to view the offers which have been submitted for that channel in a list format, grouped into rotations in the rotations area window 1900 (FIG. 19).

FIGS. 17 and 18 show the calendar area window 1700. The calendar area window 1700 allows the user to view the offers which have been submitted for a selected channel 1702 and week 1704 in a color-coded calendar-based heat map 1706.

In some implementations, there are multiple demand lenses which may be used to view the offers in different ways. Such lenses may be selected by a demand lens view icon 1708. As an example, demand lenses may include uplift amount, offer rate, DR avails, offer count, and open capacity. The uplift amount view displays darker shades of color (e.g., green) for higher uplift amounts. Uplift is the amount that a submitted offer is higher than spots sold through another sales channel (e.g., through the traffic management system). The offered rate view displays darker shades of color for higher offers. The DR avails view shows defined DR time blocks with the number of offers, offer amounts and uplift for each block. The offer count view shows darker shades of color for half hour blocks with a higher number of submitted offers. The open capacity view shows darker shades of color for half hour blocks that have more slots that are open or preemptible slots in the traffic management system.

Once the user selects a channel, week and demand lens view, the user may select a campaign 1710 displayed on the left side of the calendar area window 1700. For each half hour block ("inventory unit"), the heat map 1706 displays the number of open and preemptible equivalent 30-second spots on the traffic management system log, the offer amount equivalized to 30 seconds, and the uplift, which is the difference between the offer amount and the average, maximum, or lowest rate for spots booked in the traffic management system.

The colors on the heat map 1706 may indicate the amount of deviation from the average based on the selected demand lens. For example, lower than average may be represented by light green, average may be represented by a medium green, and higher than average may be represented by a dark green.

In some implementations, the user may click on or otherwise select an inventory unit block to view some or all of the offers received for that block in a list (e.g., pop-up window), rather than just the highest offer which may be displayed in the heat-map 1706. Such functionality allows the user to view or accept an offer for the block which is not the highest offer, for example. The multiple offers for a single block may be sortable based on various factors, such as offer price, advertiser name, time submitted, agency, category, status, credit, etc.

To accept an offer, the user may select a channel, week, and campaign. The user may then click on or select a single block, or the user may drag across the days and times for which the seller wants to accept offers. As shown by an elliptical-shaped annotation 1712 in FIG. 18, an area selected by the user may turn a different color (e.g., teal) to indicate that multiple blocks have been selected.

When multiple blocks are selected as shown in FIG. 18, the user may select an accept rotation icon 1714 which causes an accept rotation window to be displayed. The accept rotation window may allow the user to configure the rotation start time, days, and number of spots to sell in the rotation. As noted above, in some implementations, all bids in a rotator are set to the lowest bid rate in a particular grouping.

The user may also select a creative icon 1716 to review and approve the creative before accepting the rotation. In some implementations, creatives may be approved by group. For example, creatives relating to a particular topic (e.g., alcoholic beverages, politics) may be accepted for a first group of channels (e.g., sports channels, movie channels) but rejected for a second group of channels (e.g., religious channels, children's programming channels).

The user may also select a credit icon 1718 to review and approve the credit of the advertiser before accepting the rotation. As an example, FIG. 23 shows a review credit window 2300 which provides details for an advertiser or agency (e.g., Advertiser A) including credit limit 2302, credit available 2304, status information 2306, days outstanding 2308, advertiser categories 2310, an agency of record form icon 2312 which provides access to an agency of record form, and a credit application icon 2314 which provides access to the advertiser's credit application. The status information 2303 may include credit information about an advertiser or agency relating to other sellers. For example, the status information 2303 may include credit approval information for the advertiser from other sellers and may indicate whether the advertiser is making payments to other sellers on time. Such features allow sellers to view how much good or bad credit an advertiser has across the entire marketplace.

FIG. 19 shows the rotations area window 1900 which displays a list 1902 of the offers submitted by buyers for the selected channel and day. Offers may be grouped into rotations by channel, agency, advertiser and adjacent half hour blocks.

To accept an offer from the rotations area window 1900, the user may select the rotations icon 1604 (FIG. 16) from the dashboard area window 1600 to cause the rotations area window to be displayed. The user may then click on a manually accept offer icon 1904 next to a rotation to accept a rotation from the list 1902. Upon selecting the manually accept offer icon 1904, an accept rotation window may be displayed which allows the user to configure the rotation start time, days, and number of spots to sell for the rotation.

In addition to manually accepting offers, the user may also create automatic acceptance and rejection rules, as discussed above with regard to the setup of the seller console.

Figure 20:
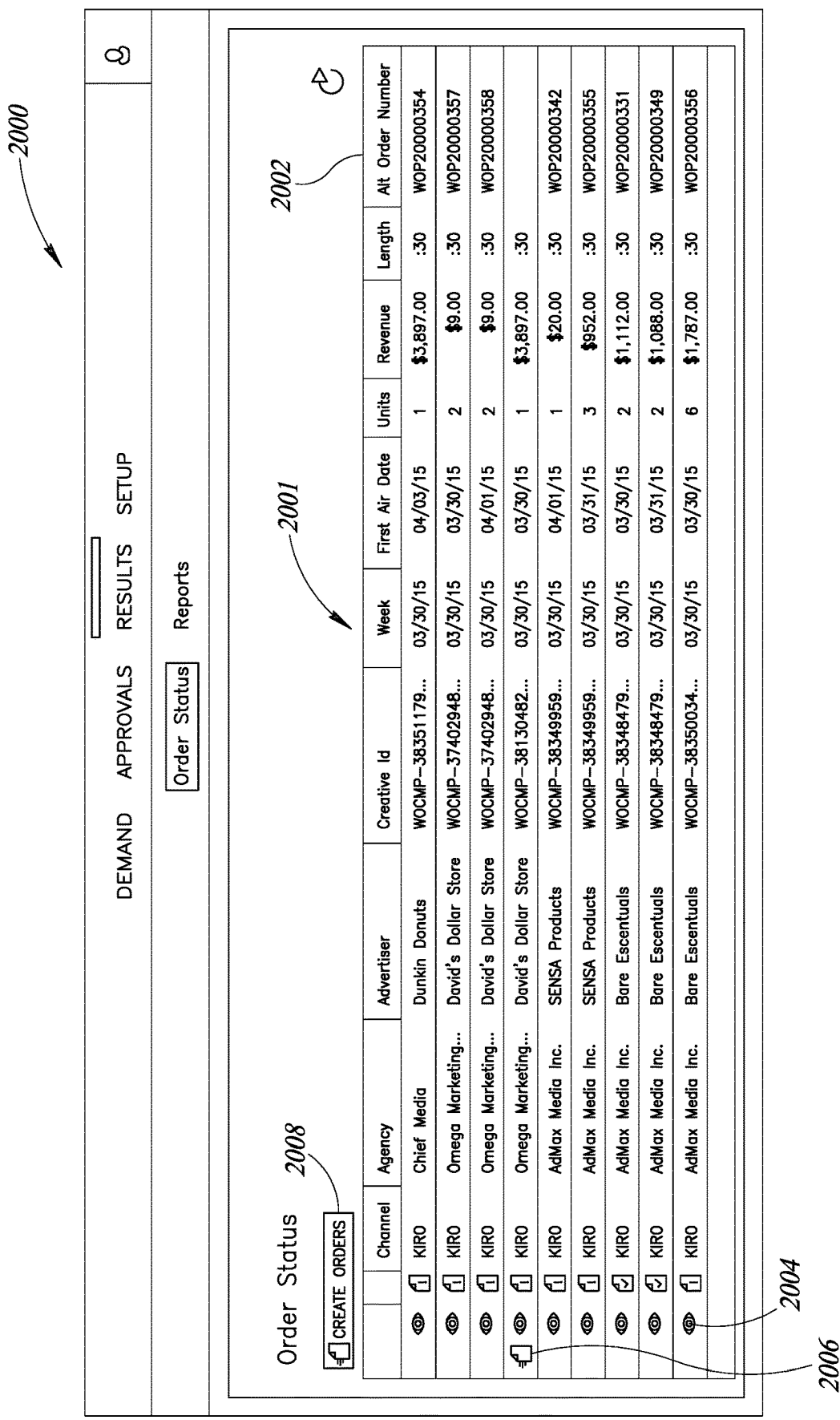
FIG. 20 is a screenshot of an order status area window of a seller console, according to one illustrated implementation.

FIG. 20 shows a screenshot of an order status area window 2000 of a results module of the seller console. When an order is manually accepted or the marketplace window closes and auto-accept rules execute, a list 2001 of orders are displayed in the order status area window 2000 of the results module. If an order has not yet been sent to the traffic management system, an Alt Order Number column 2002 is left blank. Before sending the order, the user may view the spots included by selecting a view icon 2004 next to an order. To send the order to the traffic management system, the user can select a create order icon 2006 next to an individual order or may select a create orders icon 2008 above the list 2001 to send all unsent orders to the traffic management system.

Once orders have been sent to the traffic management system, the orders are displayed in an electronic orders task where the orders can be imported into the traffic management system. Once an order is imported into the traffic management system, it may be approved and processed.

After the seller has started using the system to accept offers and to send orders to the traffic management system, and spots have begun publishing (e.g., airing), the user may want to monitor the activity. Such monitoring may be provided via the dashboard area window or the order status area window of the seller console.

In some implementations, a booking interface may be provided to show the seller whether accepted offers were booked correctly in the traffic management system. For example, in some instances, a traffic manager may move the spot around so that the sold advertisement airs outside of the agreed upon window. In such instances, the seller may not get paid. Using the booking interface, the seller can quickly identify which accepted offers have been book correctly and which accepted offers have been booked incorrectly in the traffic management system.

Figure 21:
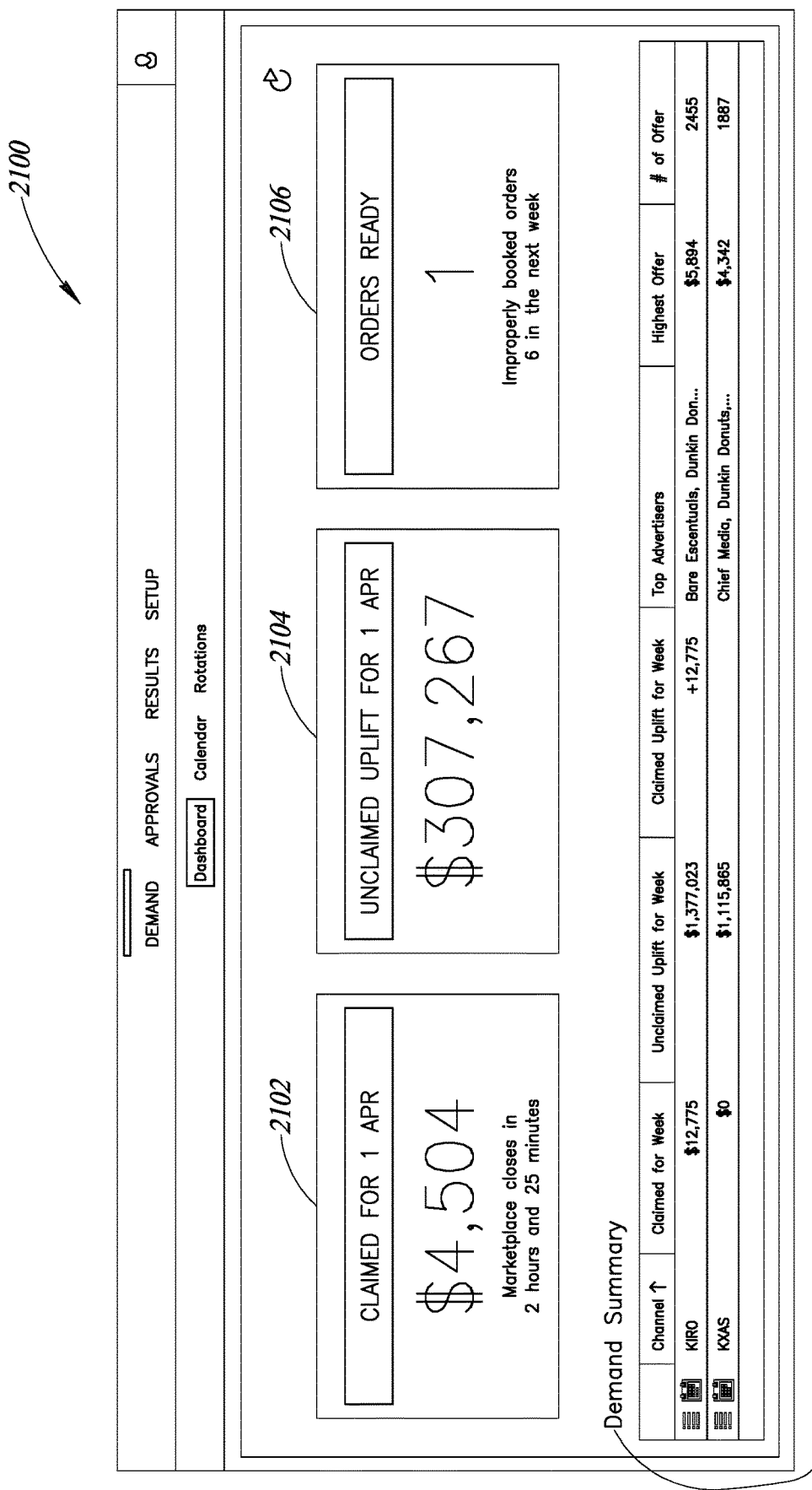
FIG. 21 is a screenshot of a dashboard area window of a seller console which shows claimed dollars, unclaimed dollars, and a number of orders ready to be sent to a traffic management system, according to one illustrated implementation.

FIG. 21 shows a dashboard area window 2100 which shows claimed (accepted) dollars 2102, unclaimed (submitted) dollars 2104, and the number of orders 2106 ready to be sent to the traffic management system. The dashboard area window 2100 also provides a demand summary section 2108 which allows the user to view an overview of the demand for each channel with offers for the upcoming week.

FIG. 22 shows an order status area window 2200 which includes status icons 2202 next to each order. A first status icon 2202 may indicate that all spots in the order are in one of the following states: not sent to the traffic management system, not placed in the traffic management system, or not placed in the correct half hour block in the traffic management system. A second status icon 2204 may indicate that some spots are placed in the correct half hour block in the traffic management system and some spots are either not placed in the traffic management system or are not placed in the correct half hour block. A third status icon 2206 may indicate that all spots in the order are placed in the correct half hour block in the traffic management system.

Sellers may generate an invoice for a "programmatic agency" in the traffic management system which causes the traffic management system to generate monthly invoices. The invoice line items may detail all purchased spots that were certified as aired within the mediacast month, for example.

Figure 24:
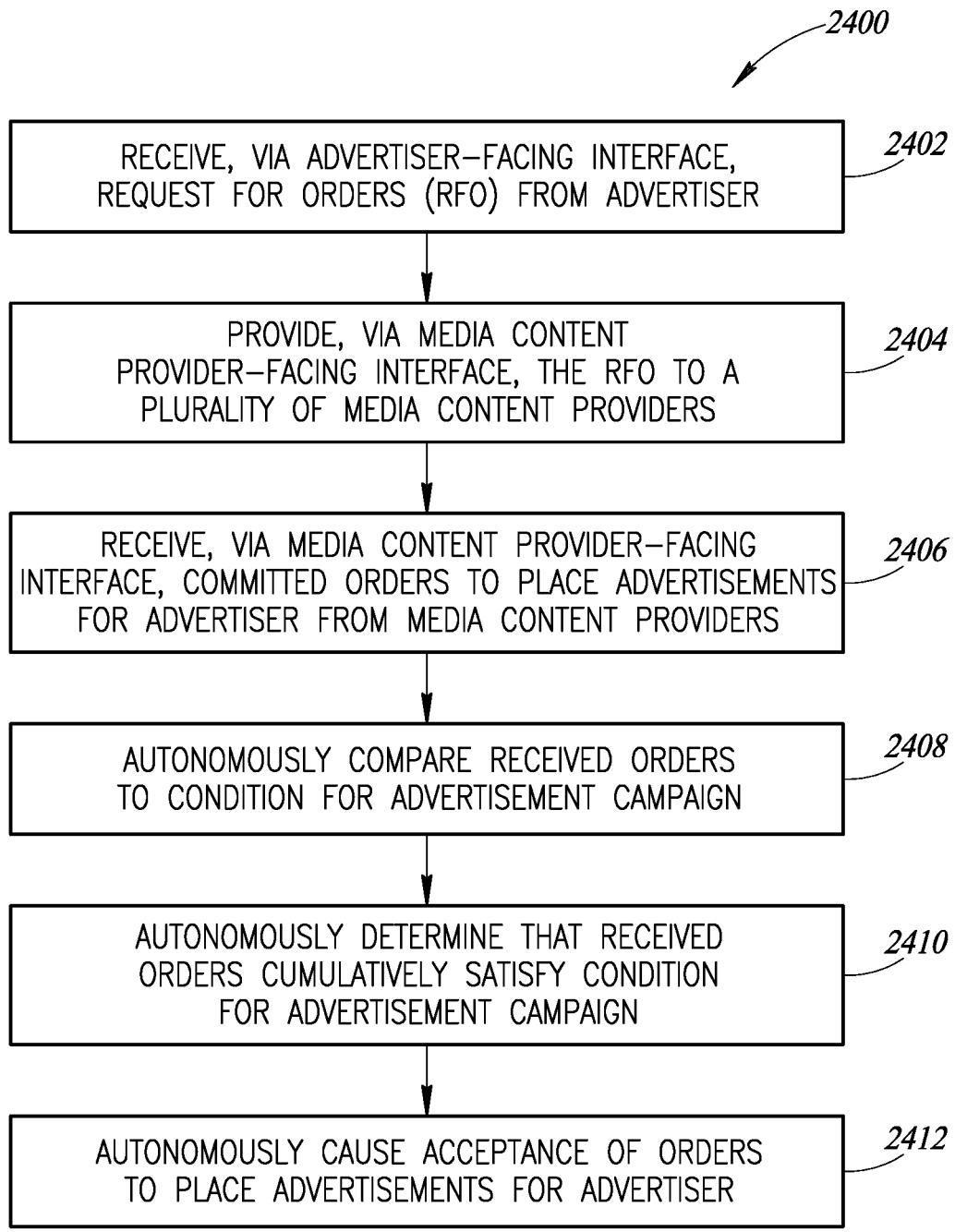
FIG. 24 shows a method of operating an advertisement platform server processor to automate placement of advertisements in a media delivery system, according to one illustrated implementation.

FIG. 24 shows a method 2400 of operating an advertisement platform server processor or system to automate advertisement placement in media delivery systems. The method 2400 may be implemented by either of the advertisement platform server systems 102 and 302 of FIGS. 1 and 3, respectively, for example.

At 2402, at least one advertisement platform server processor may receive a request for orders (RFO) from an advertiser via an advertiser-facing interface. The RFO may indicate requests for a plurality of orders for advertisements associated with a future advertisement campaign which spans multiple types of advertisement channels. For example, the RFO may include a request for orders for advertisements to be placed in at least two of: broadcast television, broadcast radio, streaming radio, podcasting, display, mobile Web, mobile in-app advertisement, video, etc.

The RFO may specify at least one condition for the advertisement campaign. For example, the RFO may specify at least one of a minimum spending budget, a per-media content provider spending limit, a media channel type spending limit, a target CPM, a frequency cap, a target demographic, a target subject matter category, a target geographic area, an open date range for the RFO (i.e., how long the RFO will be open for demand contribution), or a target delivery date range. The RFO may also indicate requests for a plurality of orders which specify a common currency (e.g., audience measurement currency) across the multiple types of advertisement channels. Alternatively, the RFO may specify a different currency (e.g., different audience rating systems) for one or more of the multiple different advertisement channels. In some implementations, the RFO may specify a separate minimum spending budget for one or more of at least two of the multiple types of advertisement channels. As an example, the RFO may specify a first minimum spending budget for broadcast television and a second minimum spending budget for digital advertisements, the second minimum spending budget different from the first minimum spending budget. The RFO may also specify a separate spending limit with respect to a particular media content provider, group of media content providers, type of media content provider, type of advertisement channel, etc.

In some implementations, the RFO may identify at least one special term negotiated between the advertiser and at least one of the media content providers. The at least one advertisement platform server processor may autonomously apply the at least one special term across at least two of the multiple types of advertisement channels. For example, the RFO may identify at least one rate discount negotiated between the advertiser and at least one of the media content providers. In such cases, the at least one advertisement platform server processor may autonomously apply the at least one rate discount across at least two of the multiple types of advertisement channels. As discussed below with reference to FIG. 28, an advertiser may be provided with a "deal identifier" or "deal ID" which indicates the existence of the negotiated special term(s) between the advertiser and one or more media content providers and which may be used to enforce the special term(s) simultaneously across multiple advertisement channels.

At 2404, the at least one advertisement platform server processor may concurrently provide the RFO to a plurality of media content providers via a media content provider-facing interface or SSP. In some implementations, the at least one advertisement platform server processor may provide media content providers with a comparison between the requests for offers in the RFO and at least one request for an offer received through at least one other (e.g., non-programmatic) sales channel. For example, the at least one advertisement platform server processor may provide media content providers with an indication of lift expected by providing one or more committed offers responsive to the RFO relative to the potential sales of advertisement opportunities outside the RFO. The indication of lift may be provided as a function of the media content providers anticipated budget, for example. Additionally, the at least one advertisement platform server processor may provide media content providers with separate indication of lift for each of the multiple types of advertisement channels specified in the RFO which may potentially be filled by the media content provider.

At 2406, the at least one advertisement platform server processor may receive, via the media content provider-facing interface, committed orders to place advertisements for the advertiser from at least one media content provider. Each of the orders may satisfy at least a portion of the at least one condition. Each of the orders may be committed in advance so that the order may be automatically accepted upon satisfaction of the at least one condition specified in the RFO.

At 2408, the at least one advertisement platform server processor may autonomously compare the received orders to the at least one condition for the advertisement campaign. In some implementations, responsive to comparing the received orders to the at least one condition for the advertisement campaign, the at least one advertisement platform server processor may provide status information regarding the received orders to at least one of the advertiser or the plurality of media content providers. For example, in cases where the at least one condition for the advertisement campaign comprises a minimum spending budget, the at least one advertisement platform server processor may provide status information regarding the received orders relative to the minimum spending budget. In some implementations, the at least one advertisement platform server processor provides a present percentage of the minimum spending budget committed by the received orders. In some implementations, the at least one advertisement platform server processor provides a present dollar amount committed by the received orders.

At 2410, responsive to the comparing of the received orders to the at least one condition, the at least one advertisement platform server processor may autonomously determine that the received orders cumulatively satisfy the at least one condition for the advertisement campaign. For example, a campaign may have a minimum spending budget of $2,000,000. The at least one advertisement platform server processor may compare the received orders to the minimum spending budget to determine when the received orders total $2,000,000.

At 2412, responsive to determining that the received orders satisfy the at least one condition, the at least one advertisement platform server processor may autonomously causes an acceptance of each of the received orders to place advertisements for the advertiser. As discussed above, once the orders have been accepted, the creatives associated with the orders may be sent to a traffic management system for publishing via the multiple advertisement channels.

Figure 25:
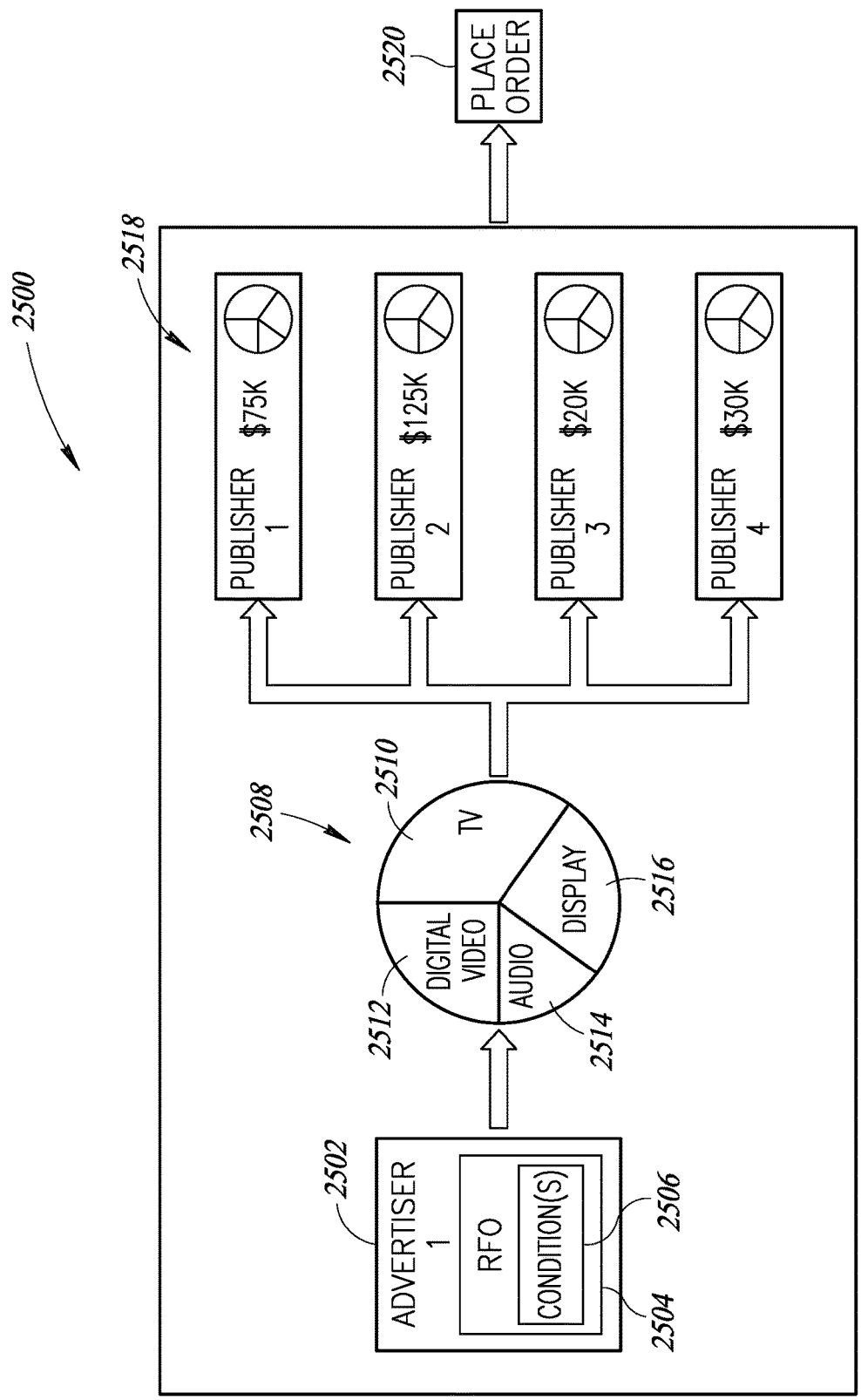
FIG. 25 is a workflow diagram of a method of operating an advertisement platform server processor to automate placement of advertisements, according to one illustrated implementation.

FIG. 25 is a workflow diagram of a method 2500 of operating an advertisement platform server processor to automate placement of advertisements. Initially, an advertiser 2502 completes an RFO 2504 which specifies one or more conditions 2506. For example, the RFO may specify a minimum budget goal of $250,000 and a target demographic of females over the age of 35.

At 2508, the advertisement platform server system makes the RFO 2504 available to a plurality of media content providers through a media content provider interface. As shown, in this example the RFO 2504 may include a request for orders across multiple advertisement channels, including television 2510, digital video 2512, audio 2514, and display 2516.

At 2518, one or more of the plurality of media content providers (or publishers) commit to a portion of the minimum spending budget specified in the RFO. In the illustrated example, PUBLISHER 1 commits to $75,000, PUBLISHER 2 commits to $125,000, PUBLISHER 3 commits to $30,000, and PUBLISHER 4 commits to $30,000. At 2520, once the advertisement platform server processor determines that the minimum spending budget of $250,000 has been met by the cumulative orders provided by PUBLISHERS 1-4, the advertisement platform server processor automatically places the orders.

Accordingly, the advertiser is able to fulfill an entire multi-channel advertisement campaign in one shot, without having to make separate channel-specific orders and without having to individually negotiate each order. Further, by specifying the one or more conditions in the RFO, the advertiser is guaranteed that the committed orders will match the types of advertisement opportunities sought by the advertiser. This is in contrast to existing systems wherein responsive to a request for proposal, media content providers may present orders to the advertiser which do not necessarily meet the advertiser's goals or expectations. Additionally, the advertiser is able to simplify management of an advertisement budget, without having to deal with situations where the campaign is over budget or under budget for any number of reasons.

FIG. 26 is a screenshot of an advertiser facing RFO interface 2600 which depicts an RFO for an advertiser of an advertisement platform server processor. As a non-limiting example, the RFO interface 2600 may include fields for an advertisement campaign name 2602 and an advertiser name 2604. The RFO interface 2600 may also include fields for total budget (and/or minimum spending budget) 2606, target CPM 2608, and frequency cap 2610.

The RFO interface 2600 may also include fields for the dates that the RFO will be open to media content providers, RFO open dates 2612 (i.e., how long the RFO will be open for demand contribution), and dates that the orders placed will be published, RFO flight dates 2614. The RFO interface 2600 may also include status information 2616, which may show a present dollar amount committed or pledged as an absolute value and/or as a percentage of the total budget. As shown, the status information 2616 may be presented in graphical form as a progress bar 2618 or other graphic.

The RFO interface 2600 may also include fields 2620 for specifying one or more conditions or targets for the advertisement campaign. In the illustrated example, the advertisement campaign includes targets relating to geography, gender, age, and subject matter category. In other instances, the RFO may specify fewer or additional targets for the advertisement campaign.

The RFO interface 2600 may also include a section 2622 which permits selection of multiple advertisement channels including, for example, broadcast television, broadcast radio, streaming radio, podcasting, display, mobile Web, mobile in-app advertisement, video, etc. For each advertisement channel selected, the advertiser may also select a percentage share of the inventory and a target CPM. For example, the advertiser may indicate that 25% of the total budget for the advertisement campaign should be spent on programmatic broadcast television, 30% should be spent on programmatic streaming radio, and 45% should be spent on programmatic video. Once completed, the RFO may be concurrently provided to numerous media content providers.

FIG. 27 is a screenshot of a media content provider interface 2700 which depicts a request for orders for a media content provider of an advertisement platform server processor. Similar to the advertiser facing RFO interface 2600 of FIG. 26, the media content provider RFO interface 2700 includes fields for an advertisement campaign name 2702, advertiser name 2704, total budget (or minimum spending budget) 2706, target CPM 2708, frequency cap 2710, RFO open dates 2712, RFO flight dates 2714, status information 2616, a progress bar 2618, and fields 2620 which specify one or more conditions or targets for the advertisement campaign.

The RFO interface 2700 may also include a minimum budget field 2722 which may indicate the minimum budget that will trigger acceptance of the orders committed in response to the RFO. In some implementations, the RFO may not specify a minimum budget so the target budget may be used to trigger acceptance of the committed orders. The RFO interface 2700 may also provide a section 2724 which provides various metrics for the media content provider to determine how much (if any) of the available inventory in the RFO it should order to maximize yield. The RFO interface 2700 may present one or more graphs which predict the amount of inventory the media content provider could satisfy to be profitable, and the amount of lift which may be achieved overall and/or on a per-channel basis. Such information may be based on historical evidence of what the media content provider could sell through avenues outside of the RFO, for example.

Figure 28:
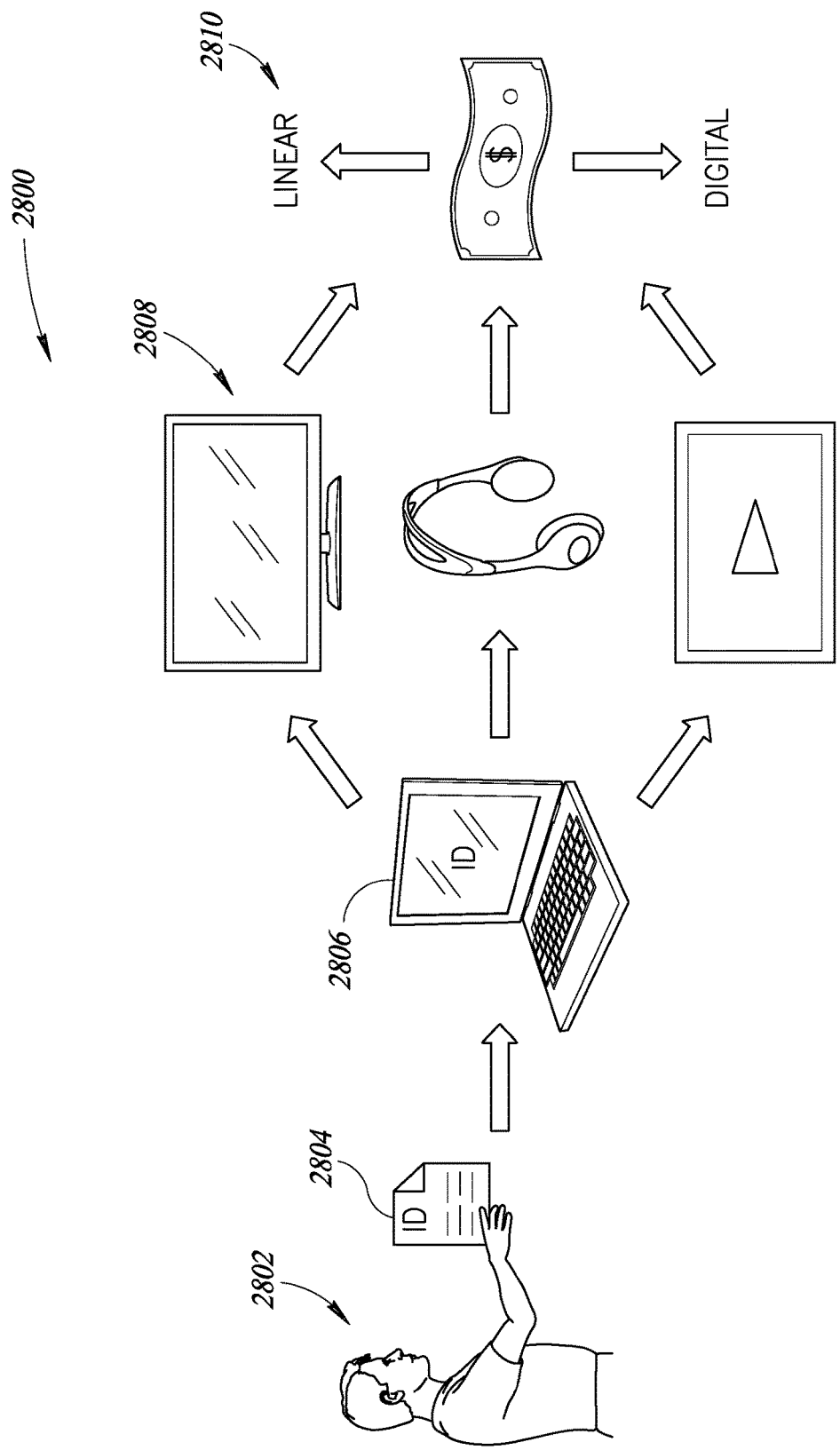
FIG. 28 is a workflow diagram of an advertiser facing interface which implements cross-channel deals between advertisers and media content providers, according to one illustrated implementation.

FIG. 28 is a workflow diagram of method 2800 of operating an advertisement platform server processor or system to automate advertisement placement in media delivery systems which includes cross-channel deals between advertisers and media content providers. At 2802, an advertiser and a media content provider may negotiate and sign a deal which includes one or more special terms (e.g., discount rates). For example, the advertiser may indicate that it wants a discount rate for spending millions of dollars up front for a particular advertisement campaign. Responsive to a deal being agreed upon (e.g., signed), the advertisement platform server processor or system may issue a deal ID 2804 to the advertiser.

The advertiser may provide the deal ID 2804 via an advertiser facing user interface 2806 when providing bids 2808 which span multiple advertisement channels (e.g., broadcast television, broadcast radio, digital). At 2810, the advertisement platform server processor or system manages the deal terms associated with the deal ID 2804 across the multiple channels (e.g., linear, digital) so that the advertiser is able to obtain the negotiated deal regardless of which advertisement channels are used to publish the advertisements. Thus, advantageously, advertisers and media content providers are able to perform transactions under special terms which span across multiple channels or platforms, without having to engage in time consuming and costly channel-specific negotiations for multiple independent deals. This feature allows media content providers to sell packaged inventory across multiple channels, and allows for the use of discounts as incentives for volume purchasing across the multiple channels.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other systems, not necessarily the exemplary system generally described above.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs) or programmable gate arrays. However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as portable disks and memory, hard disk drives, CD/DVD ROMs, digital tape, computer memory, and other non-transitory processor-readable storage media.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet, including but not limited to U.S. Provisional Application Ser. No. 61/561,186 filed Nov. 17, 2011, U.S. patent application Ser. No. 11/958,143, published as Publication No. 2008-0120638, U.S. patent application Ser. No. 13/679,828 filed Nov. 16, 2012; U.S. patent application Ser. No. 13/744,136 filed Jan. 17, 2013; U.S. patent application Ser. No. 13/711,984 filed Dec. 12, 2012; U.S. patent application Ser. No. 13/956,020 filed Jul. 31, 2013; U.S. patent application Ser. No. 14/485,416 filed Sep. 12, 2014; U.S. patent application Ser. No. 14/679,755 filed Apr. 6, 2015, U.S. Provisional Application Ser. No. 62/172,693 filed Jun. 8, 2015, U.S. Provisional Application Ser. No. 62/236,350 filed Oct. 2, 2015, U.S. Provisional application filed on Nov. 3, 2015 and U.S. Provisional Application No. 62/303,271 filed on Mar. 3, 2016 are incorporated herein by reference, in their entirety. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method to automate advertisement placement in media delivery systems, the method comprising:
receiving, by at least one advertisement platform server processor via an advertiser-facing interface, a request for orders (RFO) from an advertiser, the RFO indicates requests for a plurality of orders for advertisements associated with a future advertisement campaign which spans multiple types of advertisement channels, the RFO specifies at least one condition for the advertisement campaign and a common currency for the plurality of orders across the multiple types of advertisement channels and a separate minimum spending budget for at least two of the multiple types of advertisement channels;
providing, by the at least one advertisement platform server processor via a media content provider-facing interface, the RFO to a plurality of media content providers, including a comparison between the requests for orders in the RFO and at least one order received through at least one non-programmatic sales channel, wherein the comparison includes an indication of lift expected by providing one or more committed orders responsive to the RFO relative to potential sales of advertisement opportunities via the at least one non-programmatic sales channel outside the RFO;
receiving, by the at least one advertisement platform server processor via the media content provider-facing interface, committed orders to place advertisements for the advertiser from multiple media content providers of the plurality of media content providers, each of the orders satisfying at least a portion of the at least one condition;
autonomously comparing, by the at least one advertisement platform server processor, each of the received orders cumulatively to the at least one condition for the advertisement campaign;
responsive to the comparing of the received orders to the at least one condition, autonomously determining, by the at least one advertisement platform server processor, that the received orders cumulatively satisfy the at least one condition for the advertisement campaign;
responsive to determining that the received orders satisfy the at least one condition, autonomously causing, by the at least one advertisement platform server processor, a cumulative acceptance of each of the received orders to place advertisements for the advertiser; and
responsive to acceptance of each of the received orders, autonomously sending, by the at least one advertisement platform server processor, advertisement content for each of the received orders at the same time to a traffic management system for publishing via the multiple media content providers.

2. The method of claim 1 wherein receiving the RFO from the advertiser comprises receiving an RFO from the advertiser which specifies the at least one condition as at least one of a per-media content provider spending limit, a media channel type spending limit, a target CPM, a target demographic, a target subject matter category, a target geographic area, or a target delivery date range.

3. The method of claim 1 wherein receiving the request for orders (RFO) from the advertiser comprises receiving the request for orders (RFO) from the advertiser wherein the at least two of the multiple types of advertisement channels comprises at least two of: broadcast television, broadcast radio, streaming radio, podcasting, display, mobile Web, mobile in-app advertisement, or video.

4. The method of claim 1 wherein receiving the RFO from the advertiser comprises receiving the RFO from the advertiser wherein the at least two of the multiple types of advertisement channels comprises linear advertisement channels and digital advertisement channels.

5. The method of claim 1, further comprising:
prior to determining that the received orders cumulatively satisfy the at least one condition for the advertisement campaign, providing, by the at least one advertisement platform server processor, status information regarding the received orders to at least one of the advertiser or the plurality of media content providers.

6. The method of claim 5 wherein providing status information regarding the received orders to at least one of the advertiser or the plurality of media content providers comprises providing status information regarding the received orders relative to the separate minimum spending budget.

7. The method of claim 6 wherein providing status information regarding the received orders to at least one of the advertiser or the plurality of media content providers comprises providing a present percentage of the separate minimum spending budget committed by the received orders.

8. The method of claim 6 wherein providing status information regarding the received orders to at least one of the advertiser or the plurality of media content providers comprises providing a present amount committed by the received orders.

9. The method of claim 1 wherein providing media content providers with the indication of lift comprises providing media content providers with the indication of lift as a function of the separate minimum spending budget specified by the RFO.

10. The method of claim 1 wherein providing media content providers with an indication of lift comprises providing media content providers with a separate indication of lift for each of the at least two of the multiple types of advertisement channels.

11. The method of claim 1 wherein receiving the RFO from the advertiser comprises receiving the RFO from the advertiser which identifies at least one special term negotiated between the advertiser and at least one of the media content providers, the at least one special term applies across at least two of the at least two of the multiple types of advertisement channels.

12. The method of claim 11 wherein receiving the RFO from the advertiser which identifies at least one special term comprises receiving the RFO from the advertiser which identifies at least one rate discount negotiated between the advertiser and at least one of the media content providers, the at least one rate discount applies across at least two of the at least two of the multiple types of advertisement channels.

13. A system to automate advertisement placement in media, the system comprising:
  at least one advertisement platform server processor;
  at least one nontransitory processor-readable storage medium communicatively coupled to the at least one advertisement platform server processor that stores at least one of processor-readable instructions or data which, when executed by the at least one advertisement platform server processor, cause the advertisement platform server processor to:
    receive, via an advertiser-facing interface, a request for orders (RFO) from an advertiser, the RFO indicates requests for a plurality of orders for advertisements associated with a future advertisement campaign which spans multiple types of advertisement channels, the RFO specifies at least one condition for the advertisement campaign and a common currency for the plurality of orders across the multiple types of advertisement channels and a separate minimum spending budget for at least two of the multiple types of advertisement channels;
    provide, via a media content provider-facing interface, the RFO to a plurality of media content providers, including a comparison between the requests for orders in the RFO and at least one order received through at least one non-programmatic sales channel, wherein the comparison includes an indication of lift expected by providing one or more committed orders responsive to the RFO relative to potential sales of advertisement opportunities via the at least one non-programmatic sales channel outside the RFO;
    receive, via the media content provider-facing interface, committed orders to place advertisements for the advertiser from multiple media content providers of the plurality of media content providers, each of the orders satisfying at least a portion of the at least one condition;
    autonomously compare each of the received orders cumulatively to the at least one condition for the advertisement campaign;
    responsive to the comparison of the received orders to the at least one condition, autonomously determine, by the at least one advertisement platform server processor, that the received orders cumulatively satisfy the at least one condition for the advertisement campaign;
    responsive to the determination that the received orders satisfy the at least one condition, autonomously cause, by the at least one advertisement platform server processor, a cumulative acceptance of each of the received orders to place advertisements for the advertiser; and
    responsive to acceptance of each of the received orders, send advertisement content for each of the received orders at the same time to a traffic management system for publishing via the multiple media content providers.

14. The system of claim 13 wherein the RFO specifies the at least one condition as at least one of a per-media content provider spending limit, a media channel type spending limit, a target CPM, a target demographic, a target subject matter category, a target geographic area, or a target delivery date range.

15. The system of claim 13 wherein the RFO specifies at least two of the multiple types of advertising channels that comprises at least two of: broadcast television, broadcast radio, streaming radio, podcasting, display, mobile Web, mobile in-app advertisement, or video.

16. The system of claim 13 wherein the RFO indicates requests for a plurality of orders wherein the at least two of the multiple types of advertising channels comprises linear advertisement channels and digital advertisement channels.

17. The system of claim 13 wherein the at least one advertisement platform server processor:
  prior to the determination that the received orders cumulatively satisfy the at least one condition for the advertisement campaign, provides status information regarding the received orders to at least one of the advertiser or the plurality of media content providers.

18. The system of claim 17 wherein the at least one advertisement platform server processor: provides status information regarding the received orders relative to the separate minimum spending budget.

19. The system of claim 18 wherein the at least one advertisement platform server processor: provides a present percentage of the separate minimum spending budget committed by the received orders.

20. The system of claim 18 wherein the at least one advertisement platform server processor:
  provides a present amount committed by the received orders.

21. The system of claim 13 wherein the at least one advertisement platform server processor: provides, via the media content provider-facing interface, media content providers with an indication of lift as a function of the separate a minimum spending budget specified by the RFO.

22. The system of claim 13 wherein the at least one advertisement platform server processor: provides, via the media content provider-facing interface, media content providers with a separate indication of lift for each of the at least two of the multiple types of advertisement channels.

23. The system of claim 13 wherein the RFO identifies at least one special term negotiated between the advertiser and at least one of the media content providers, the at least one special term applies across at least two of the at least two of the multiple types of advertisement channels.

24. The system of claim 23 wherein the RFO identifies at least one rate discount negotiated between the advertiser and at least one of the media content providers, the at least one rate discount applies across at least two of the at least two of the multiple types of advertisement channels.

* * * * *